(12) United States Patent
Socolof

(10) Patent No.: US 9,160,692 B2
(45) Date of Patent: Oct. 13, 2015

(54) INTERACTIVE LIVE POLITICAL EVENTS

(71) Applicant: Deep Rock Drive Partners Inc., Las Vegas, NV (US)

(72) Inventor: Daniel Evan Socolof, Las Vegas, NV (US)

(73) Assignee: Deep Rock Drive Partners Inc., Las Vegas, NV (US)

( * ) Notice: Subject to any disclaimer, the term of this patent is extended or adjusted under 35 U.S.C. 154(b) by 56 days.

(21) Appl. No.: 13/894,269

(22) Filed: May 14, 2013

(65) Prior Publication Data

US 2014/0237381 A1    Aug. 21, 2014

Related U.S. Application Data

(63) Continuation of application No. 12/586,920, filed on Sep. 28, 2009, now Pat. No. 8,442,424.

(60) Provisional application No. 61/100,701, filed on Sep. 26, 2008, provisional application No. 61/100,703, filed on Sep. 26, 2008, provisional application No. 61/100,704, filed on Sep. 26, 2008, provisional application No. 61/100,706, filed on Sep. 26, 2008.

(51) Int. Cl.
| H04H 20/71 | (2008.01) |
| --- | --- |
| H04L 12/58 | (2006.01) |
| G06Q 10/02 | (2012.01) |
| G06Q 10/06 | (2012.01) |
| G06Q 10/10 | (2012.01) |
| G06Q 30/02 | (2012.01) |
| G06Q 30/06 | (2012.01) |

(52) U.S. Cl.
CPC .............. *H04L 51/046* (2013.01); *G06Q 10/02* (2013.01); *G06Q 10/0637* (2013.01); *G06Q 10/1093* (2013.01); *G06Q 30/02* (2013.01); *G06Q 30/0246* (2013.01); *G06Q 30/0252* (2013.01); *G06Q 30/0282* (2013.01); *G06Q 30/0601* (2013.01)

(58) Field of Classification Search
CPC ........ G09B 7/00; G09B 5/08; H04L 12/1813; H04L 12/18; H04L 51/32; H04L 65/00; H04L 65/4007; G06Q 10/02; G06Q 10/06; G06Q 50/01; H04W 4/02; H04W 4/025; H04W 80/00
USPC .......... 455/456, 457, 435; 725/139, 140, 135, 725/105
See application file for complete search history.

(56) References Cited

U.S. PATENT DOCUMENTS

| 2002/0108125 A1* | 8/2002 | Joao ............................... 725/139 |
| 2002/0115453 A1* | 8/2002 | Poulin et al. .................. 455/456 |
| 2006/0173701 A1* | 8/2006 | Gurvey ............................. 705/1 |
| 2009/0067349 A1* | 3/2009 | Glueckman et al. .......... 370/260 |

* cited by examiner

Primary Examiner — Tu X Nguyen
(74) Attorney, Agent, or Firm — Perkins Coie LLP

(57) ABSTRACT

An interactive political event allows clients to provide feedback to political candidates speakers and/or event producers relative to the event being observed. Feedback options include shout outs, emotapplause, and voting. Ticket scarcity management system adjusts event marketing, and/or ticketed sales methodologies, which include free and paid to maintain optimal conditions for an interactive political event. Multiple video/audio streams of an interactive event are simultaneously distributed as part of a broadcast to enable switching between streams by the online audience members and/or users without interruption of the presentation of the event and may include additional data relative to a candidates and/or speakers history and/or position with respect to issues being debated and/or discussed.

23 Claims, 15 Drawing Sheets

1100
Establish Event and Corresponding Ticketing Schema

1110
Ticketing Promo Codes

1230
Doors Open Countdown

1260
Limited Seating Warning

1290
Sold Out Redirection

Enter Event Promo Codes:

Enter Promo codes: [          ]

( Submit )

D4J6-YRJW-WVCB
6BVQ-MHVS-FKRQ
2CSN-8RYS-ZUWD

<u>1300</u>
Ticketing Promo Codes

*Figure 13A*

Support Candidate A (or B)

Get a Ticket for $1.00 and bring 3 friends for free!

<u>1350</u>
Ticketing Bonus

*Figure 13B*

1410
Emoticon

1420
Issue List Votes

1430
Shout Out

1440
Camera Selector

INTERACTIVE LIVE POLITICAL EVENTS

CROSS-REFERENCE TO RELATED APPLICATION

The present application is a continuation of prior U.S. patent application Ser. No. 12/586,920, filed on Sep. 28, 2009, which is a non-provisional application that claims priority to provisional U.S. Patent Application No. 61/100,701, entitled "Interactive Live Events" and provisional U.S. Patent Application No. 61/100,703 entitled "Interactive Events" and provisional U.S. Patent Application No. 61/100,704 entitled "Ticket Scarcity Management for Interactive Events" and provisional U.S. Patent Application No. 61/100,706 entitled "Switching Camera Angles during Interactive Events" all filed on Sep. 26, 2008, the entire contents of which are incorporated herein by reference.

TECHNICAL FIELD

Embodiments of the present disclosure generally relate to data evaluation, categorization, and presentation. More particularly, the embodiments of the present disclosure relate to devices and systems, which help deliver live political events online via the Internet in various media forms and allow both candidates and/or issue advocates to interact with the on-line observers.

BACKGROUND

Attempts to display media on computers date back to the earliest days of computing. However, little progress was made for several decades, primarily due to the high cost, limited capabilities and to a lesser extent compatibilities of available computer hardware. Recently consumer-grade personal computers have become powerful enough to display various types of media, including high quality audio and/or video.

Streaming multimedia represents one method of media distribution on the Internet. In essence streaming multimedia is multimedia that is broadcast by a streaming provider to an end-user. Generally, the term streaming specifically refers to the delivery method of the data rather than to the content. Unfortunately, streaming typically requires tremendous bandwidth and/or latency to cache the data locally. Recent advances in computer networks combined with powerful home computers and modern operating systems have made possible, i.e. practical and affordable, the near universal distribution of streaming media for ordinary consumers. Universal distribution represents multimedia that is constantly received by, and normally presented to, an end-user while it is being delivered by a streaming provider.

A stream of media can be provided on-demand or live. On demand streams are stored on a server for a long period of time, and are available to be transmitted upon receiving a user's request. Live streams may still use a server to broadcast the event, but are typically only available at one particular time, such as a live sporting event, a political debate, an educational lecture, or a concert. Live streams may be edited and converted into on demand streams for later content consumption. Current on-demand or live streams often introduce too much latency and thereby lose any possibility for constructive live feedback from the streaming targets. Essentially, live online presentations to large streaming audiences generally only provide unidirectional information in a manner that is difficult to facilitate observer participation. On demand performances are presented after the fact, preventing the presenter and/or observer(s) from directly altering the previously recorded presentation.

SUMMARY

In view of the problems in the state of the art, embodiments of the invention are based on the technical problem of optimizing interactive live political and/or social issue events, categorization, and presentation in an online environment. While the internet already allows many services for one way communication and event broadcast, there have been no options for providing real time, two way interactivity between: the online audience members and/or the people creating the event including third party media producers and/or the candidate/issue organizations and/or licensees. Systems and methods presented in this disclosure provide this very type of interactivity to create truly compelling live political events on the Internet.

Various types of relative feedback options may include shout outs, emotapplause, and voting. In addition to the speakers and/or candidate(s) seeing the feedback at the event origination center, the audience members may also see a subset of the feedback messages, thus providing a sense of community and participation among all of the other online audience members of the event. These feedback options may also be filtered to the event origination center and the other audience members via network production/operation centers tasked with monitoring the feedback.

Shout outs are a text messages sent from the users to the candidates, speakers, online event producers and/or to other online audience members. The intent of the shout out is for the online audience members to be able to send a directed message and/or question to at least one candidate, speaker and/or the producers and/or other audience members. Because the number of online audience members could be very large for a worldwide internet event, there is no guarantee that all messages will be presented to the candidate(s), speakers and/or producers and/or online audience members. However, due to the mechanism of transferring shout out messages, a good random sampling of messages from all online audience members will be presented to both the candidate(s), speakers' event producers and/or other audience members.

Emotapplause is a mechanism of sending non-verbal communication from the online audience members to at least one candidate, speaker, other online audience members and/or event producers. By clicking graphical representations of the emotapplause a message is sent to a centralized service that aggregates all of the feedback from the online audience. Specific graphical representations will vary depending on the event, but may include symbols like clapping hands, a heart, thumbs up/down signs, a validation checkmark, a question mark, happy and sad faces, and the like. The candidate(s) and/or speakers then see a graphical representation of the aggregated feedback. The actual event experience by the candidate(s) and/or speakers can change based on how many online audience members are using a particular emotapplause image at that moment, so, for example, if 70% of the audience was 'clapping' and 10% of the audience was sending thumbs down images, the visualization might include very large clapping hands and/or many clapping hands. At the same time a smaller representation of at least one thumbs down image might be displayed to represent the minority opinion(s) in the audience.

One of the best ways to keep an audience engaged in a political and/or social activism online event is to give them some control of how the event unfolds. Providing a voting mechanism allows them to decide what issues are discussed and/or the order of issues presented and/or the time devoted to specific issues, and/or any number of other mechanisms for impacting the flow of the event based on popular online audience votes. An online interactive event producer and/or event organizer may use the ranked lists generated from the client/user interface in a variety of ways including: to present audience feedback to at least one candidate and/or speaker; and/or to alter a previously recorded presentation for individual observers on demand. An online event producer and/or any third party event organizer, including but not limited to: news organizations and/or media companies candidates, political parties and/or campaign management may solicit feedback from online audience members according to a variety of factors. These factors can include: prior online audience online event experience, topical political and or social issues, ability to donate funds, volunteer their time and/or the relative abilities of at least one candidate and/or speaker to speak to and/or debate on various issues. Online event producers such as media organizations, political parties, and/or campaign management may also maintain and/or improve online participant satisfaction, which can result in higher ratings and/or higher fundraising by reviewing and/or factoring the event issue rankings from online audience members into the decisions on what issues to include, in what order and with what time parameters for at least one online interactive political event In one embodiment of the present disclosure relates to systems, which can deliver, live political debates with at least two candidates or at least one speaker online via the internet in various media forms and allow both the candidates or at least one speaker and the observers attending the interactive online event to interact. For example, the Democratic National Committee may organize or license to a third party the right to organize a debate among at least two candidates in which the online observers can interact with the candidates by providing near and/or real time feedback relating to the importance of the issues being debated from the viewpoint of the online observers. Alternatively, a social activism organization, for example, one organized to promote legalized abortion, can organize a, regional, national and/or international online audience as free online event and/or as a paid online fundraising event. During the online interactive event a speaker and/or event producer can receive input from the online audience on which issues most online observers believe are most important vs. least important in the abortion rights arena from the viewpoint of the online audience. This would provide feedback to at least one speaker; event organizer and/or event producers so that they can modify their discussion to best reflect the interests of the online audience attending the event.

Producers of political debates including, but not limited to: news organizations, Political parties, social activists, NGO's and/or other organizations and/or candidates themselves can stream a live political debate and/or discussion to an online audience live or on demand. However, a live and/or on demand system to interact with an online audience allowing the candidates, speakers and/or event organizers to incorporate online audience feedback on various issues, makes it possible, in near and/or real time to modify the course of the online event in terms of; subject matter, issues, the order the issues are presented to the online audience and/or the time devoted to at least one particular subject and/or issue.

In one embodiment online audience members can vote on the order of issues they feel should be discussed and/or debated. For example, the Republican National Committee can organize a regional and/or national debate and/or discussion of issues they feel are important to the party. By allowing the online audience members to vote, in advance and or live regarding the relative importance of the issues, the Party can better target and engage the specific online audience for a particular online interactive event. Additionally, the online event may include inviting participants including Republican Party members and/or an audience of other affiliated and/or unaffiliated parties giving the Republican Party an opportunity within the online interactive event to better target and/or engage swing voters from other parties because their interest in at least one issue issues is presented to the candidates and/or speakers live during the online event. This can result in at least one candidate and or speaker focusing on and or speaking to, for example, conservative Democrats in the online audience and acknowledging their interests, which can be different from the affiliated Republican online audience members, so that candidates and/or speakers best engage with positive result, the entirety of the online audience actually participating in the event. Alternatively, during an online fundraiser and/or discussion for a health care reform advocacy group, speakers can request online observers to vote on at least one course of action they should pursue with respect to changing laws or regulatory matters regarding the import from other countries of generic and/or brand medicines.

In one embodiment, at least one online audience member can provide feedback to at least one candidate and/or speaker and/or event producer relating to the emotional response to candidates and/or speakers presentation of issues via emotapplause and/or shoutouts. For example, an advocacy group promoting a reduction of carbon emissions may organize an interactive online event with a group of online observers and through the interactive feedback provided by emotapplause, better understand during the online event what kinds of polluting energy systems, for example; coal vs. gasoline pick up trucks, are more or less important to the online event audience. Audience members can send in thumbs up icons, for example, to signify alignment with targeting the automobile industry as polluters vs. thumbs down icons regarding targeting coal producing companies. The relative size of the thumbs up vs. thumbs down icons will guide the speakers to more positively target and/or effectively engage the online event audience as it relates to what specific action the advocacy group can and/or should pursue following the online event to reflect the desires of the online audience.

In one embodiment at least one candidate and/or speaker would receive geographical location data regarding a specific online event audience who select a stream representing the candidate and/or speaker. For example, a candidate running for President of the United States could organize and/or license to third party producers the right to organize an interactive online event whereby online event audiences are identified and categorized by IP addresses that correlate to specific cities and/or zip codes. This can allow the candidate and/or their campaign management to better evaluate and/or calculate how at least one issue the candidate is speaking about resonates positively and/or negatively with respect to where online event audiences live. The candidate can then better speak to the interactive feedback of the audience and tailor near and/or real time dialogue. This can impact the online event audience by reflecting that the candidate understands that what might be vitally important to a New York City audience; eg. anti terrorism funding is relatively less important to online observers in Portland Oreg. who are more concerned about carbon emissions affecting air quality. Knowing how many online event members are in New York City vs. Portland, in the aforementioned example, clearly indicates the advantage of geographical data being displayed to candidates and or speakers from online audience members selecting a camera and or data stream from that candidate during the online event. Additionally, near and/or real time modification of the presentation on the part of the speakers and/or candidates and/or their respective producers towards at least one geographical audience by location, regarding what is important to that online audience gathered for a particular event can result in improved engagement with issues that are important to that actual online interactive audience. Alternatively, at least one speaker and/or candidate may find that the geographical aggregation of their online event audience is concentrated in rural vs. major city locations thereby providing the speakers guidance as to how the geographical location of the audience can affect the kinds of issues they speak to, for example; farming issues for a rural online audience vs. mass transportation concerns of an audience more concentrated in major cities. Alternatively, understanding the relative geographical size of an online audience selecting a particular stream, for example how many audience members are selecting a candidates stream who live in Texas vs. New York, both large states, can assist the candidate in evaluating the relative merits of shout outs, voting and/or emotapplause from those respective locations and thereby help evaluate how the candidate and/or speaker chooses to respond to that feedback and or whether the candidate and or speaker responds to the feedback. For example, if there are ten audience members from Texas sending various forms of negative feedback to the candidate vs. hundreds or thousands of positive expressions of feedback being sent from New York, a candidate and/or producer and or campaign management may decide to not engage with the negative feedback. Alternatively, by example, if the feedback generated from online audience members is both positive and negative, and relatively evenly split among geographical locations the candidate can acknowledge that the audience is evenly divided on a particular issue and guide their comments accordingly.

Yet another way that an audience member of the broadcast controls how the interactive event is presented includes selecting which stream(s) they want to watch of the online broadcast event. More specifically, multiple camera angles of an interactive event are simultaneously transmitted as part of a broadcast in the form of multiple synchronized streams of audio and/or visual information. The client interface enables switching between cameras to be made by the online audience members of the broadcast without interruption of the presentation of the event. Selection of one of the streams may also direct interactive feedback portions generated by the selecting audience member towards the selected object/individual. Alternatively, interactive feedback generated by the audience member may be directed globally to the producers of the event and selectively to the candidate(s)s and/or other audience members of the event.

In one embodiment, an online event audience member selects and/or switches to a specific stream of audio and/or video data correlating to a specific political candidate and/or speaker in the online event and receives data regarding that candidates voting record and/or verbal and/or written record regarding at least one issue discussed and/or debated in the online interactive event. For example, during a Democratic National Committee authorized online debate event, which features at least more than one candidate, online audience members can switch the video and/or audio streams to focus on particular candidates during a discussion of health care policy, change those streams whenever they desire and receive audio and/or video data regarding the selected candidates record on health care issues. Alternatively the online audience members may switch to a different stream for a different candidate and receive data on that candidate's health care record thereby providing online event members with more comprehensive data than merely the live and/or on demand presentations by the candidates provide themselves. For example, during a political event with at least one candidate, an online audience member selecting the stream presenting a particular candidate, can result in that online audience member receiving data about the candidates voting record on all heath care issues when the candidate is speaking about and/or debating other candidates about health care issues. This would be particularly important to cement credibility for a particular candidates consistent position regarding their health care policies and/or alternatively present the observer with a data flow and/or voting record that shows the candidate flip flopping on health care voting and/or policies that can undermine the candidates presentation to the online event audience. A more comprehensive data flow from selecting a specific camera angel could present data aggregated by a particular third party for example; a news organization, a health care advocacy group and/or a political party The online audience might be given a choice of which data to receive from among many data providers. Alternatively, during an interactive fundraising online event, when an audience member selects a candidate's stream, the users can send that candidate feedback relative to the effectiveness of their presentation regarding a particular issue by sending emotapplause, for example, hearts reflecting they strongly support the candidates position vs. arrows reflecting their disapproval on an issue while the candidate is speaking on a particular issue.

In one embodiment at least one candidate and/or speaker would receive information during an event and/or after an event about users relative agreement for particular positions and/or issues presented by a candidate. For example, live online polling in the form of real time voting by observers during a debate can provide candidates with feedback for the relative strength and/or weakness of a position they are taking on various issues. Emotapplause and/or shouts can provide contextual messaging on the emotional and/or nuanced feelings by an online event audience regarding a candidates specific presentation. Acknowledging feedback from online audience members can build a stronger bond and/or sense of community and/or trust between the candidate and the online event audience. Alternatively, audience members can see how they collectively feel about an issue building a stronger community feeling and/or sense of shared values during a live event, among the online audience or a diminished sense of community, as the voting information of audience members is displayed on their client modules.

In one embodiment, interactive content such as emotapplause and/or shoutouts and/or voting generated by online audience event members is used by producers of the event to calculate the merits of lengthening or shortening the event time given to particular issues being debated and/or discussed. For example, during a Democratic State debate between at least two candidates, campaign issues for example, same sex marriage, can provoke larger quantities of emotapplause and/or shoutouts vs. a discussion around greater public funding for parks. Candidates and/or online event producers can benefit by lengthening the time segment for debate around same sex marriage and decreasing the time segment debating funding for parks thus maintaining the interests, longer, of a greater proportion of the online audience. Alternatively, producers of an interactive online debate can find that a small amount of an online audience is very actively sending interactive feedback around a particular issue and that lengthening the time segment devoted to that issue would address a small portion of the online audience potentially decreasing the interest of the larger audience.

In one embodiment, voting by the online event audience can guide the event producer's decisions as to what topics to direct the candidates to discuss and/or debate in the online interactive event. For example, real time voting during an interactive event on the issues important to the online audience can be different than pre event polls trying to predict the interests of actual online event attendees. Since events are scheduled live and often occur over the course of one or more hours, audiences may come and go, as is often the case. Therefore, it is likely that the geographical and actual numbers of the online audience will change during the event. Constant voting by then attending online audiences can provide event producers with up to the minute guidance on the scheduling of the topics to direct the candidates to debate and or discuss reflecting the changing composition of the audience. Alternatively, during an interactive fundraising event for a charity eg. cancer, voting by the then attending online audience could direct producers to focus speakers, during a specific time, on breast cancer vs. prostrate cancer reflecting the interests of the online audience during a given moment in time participating in the event. This can improve the opportunity to generate donations to the cause, in this example cancer, because there were many more online audience members voting to hear about treatment advances for breast cancer in a particular time of the online event With that focus, online event organizers can optimize fundraising because the interests of a changing audience are addressed. Alternatively, in the same cancer online interactive fundraising event, at a different time during the event, more online users might be interested in prostrate cancer treatment advances. Addressing the changing interests of the online audience to event producers who can modify the speaker's focus, from time to time, can improve the effectiveness and/or relevancy of a fundraising event and or event to engage an online audience thereby optimizing the effectiveness of the event goals by reflecting the changing interests of the online audience with data directed to the online event producers and or speakers.

In one embodiment, voting by the online audience members can guide the order in which political issues are discussed and/or debated by the candidates in the online interactive event. For example, online event organizers, like CNN, could present at least two or more issues to the online participants of a political debate so that instead of a predetermined order of issues being debated, the online audience members can control the order in which the issues are debated. This can greatly increase the opportunity for an organizing producer, like CNN and/or any other third party media organization and or event producer to optimize audience retention and/or maximize audience ratings because the interests of the event audience are reflected in the order in which issues are debated One illustrated and described method provides large scale, real-time interactivity between distributed audience members on the internet and political candidates in an interactive debate event. Multiple types of interaction are possible, including direct text communication in the form of shoutouts directed to one or more of the candidates in the debate as well as non-verbal communication, such as Emotapplause, that represents real-world feedback mechanisms like applause, fists in the air, thumbs up, thumbs down, dollar signs, confused faces, peace signs, or angry faces, among others.

Another illustrated and described method would allow online audience members and/or observers to vote on topics and/or issues that most interest them providing real time feedback to a moderator, at least one candidate, event producer and/or the online audience themselves. This information can be displayed in an interactive event origination center and/or in a network operations center and directed to the event origination center, so that at least one candidate can be informed in near or real time of the online audiences reactions to their messaging. The result can be at least one candidate can modify their messaging on at least one topic and/or issue of most concern to the online audience members and/or additional observers attending the event online. This would be most useful to candidates who want to optimize their time with prospective constituents by allowing those attending the live online political event to, in part, fashion the: course of the debate and/or discussion. This can result in more or less time relegated by event producers and/or third party organizers and/or the candidates themselves to specific issues as the users determine vs. a pre-determined event schedule or the mandates of a selected moderator and/or producer. This can impact the outcome or messaging of the political meeting and/or debate event ensuring a higher probability of positive engagement with those online audience members by incorporating the feedback to the candidates speaking to issues that are of high concern to the online audience and getting real time feedback as to the positions that at least one candidate promotes. In one embodiment, feedback may be generated via a client side module to input data on relative engagement quality of the candidates speaking ability and/or communication skills and relative emotional response(s) from the perspective of the online observer. After receiving input, the rank-value of a particular monitored response can be calculated and presented back to the candidate.

In one embodiment, a ranking can be shown or used to sort lists in some embodiments. Monitored responses may include a topic list compiled of proposed social, security, health, foreign affairs and/or any political issues for at least one candidate and/or speaker to consider. These could include subject matter for further discussion, desired topics for debate, questions regarding covered material or stated positions, and/or relative emotional responses from the online audience members to the content being presented. These customized lists and/or relative feedback of the monitored responses may be used to attract additional online audiences and/or observers.

Yet another illustrated and described method would allow the candidate and/or their campaign management and/or event organizers to gate the event online and issue tickets, free, without monetary cost to online attendees and/or with paid tickets locally, regionally and/or nationally and/or with or without a set capacity. For example, a political party can incorporate ticket scarcity marketing schemes into its online interactive event marketing. This can support an overall media campaign strategy by setting thresholds to demonstrate that a candidate can attract audiences quickly. Alternatively, a political party and/or campaign management can set event ticketing thresholds with very high capacity to demonstrate huge popularity or at least one candidate. In both examples, ticketing methodologies, charging admission to the online interactive event can be a very effective way of fundraising.

BRIEF DESCRIPTION OF THE DRAWINGS

Non-limiting and non-exhaustive exemplary embodiments of the present disclosure are described with reference to the following drawings in which:

FIGS. 13A and 13B illustrate block diagram views of portions of user interfaces, each generated to market/promote event ticket sales in accordance with various embodiments;

DETAILED DESCRIPTION

In the following detailed description, reference is made to the accompanying drawings which form a part hereof wherein like numerals designate like parts throughout, and in which are shown, by way of illustration, specific embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of a portion of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. Reference in the specification to "one embodiment" or "an embodiment" means that a particular feature, structure, or characteristic described in connection with the embodiment is included in at least one embodiment of the disclosure. The meaning of "in" may include "in" and "on." The appearances of the phrases "in one embodiment" or "in an embodiment" in various places in the specification do not necessarily all refer to the same embodiment, but it may. The term "connected" may mean a direct electrical, electro-magnetic, mechanical, logical, or other connection between the items connected, without any electrical, mechanical, logical or other intermediary there between. The term "coupled" can mean a direct connection between items, an indirect connection through one or more intermediaries, or communication between items in a manner that may not constitute a connection. The term "circuit" or "circuitry" as used in any embodiment described herein, can mean a single component or a plurality of components, active and/or passive, discrete or integrated, that are coupled together to provide a desired function and may include, for example, singly or in any combination, hardwired circuitry, programmable circuitry, state machine circuitry, and/or firmware that stores instructions executed by programmable circuitry. The term "signal" can mean at least one current, voltage, charge, data, or other such identifiable quantity.

In an effort to clarify comparative phrases used in the specification and the claims of this disclosure, please note that the following phrases take at least the meanings indicated and associated herein, unless the context clearly dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(A B) or (B)", that is "A" is optional.

Figure 2:
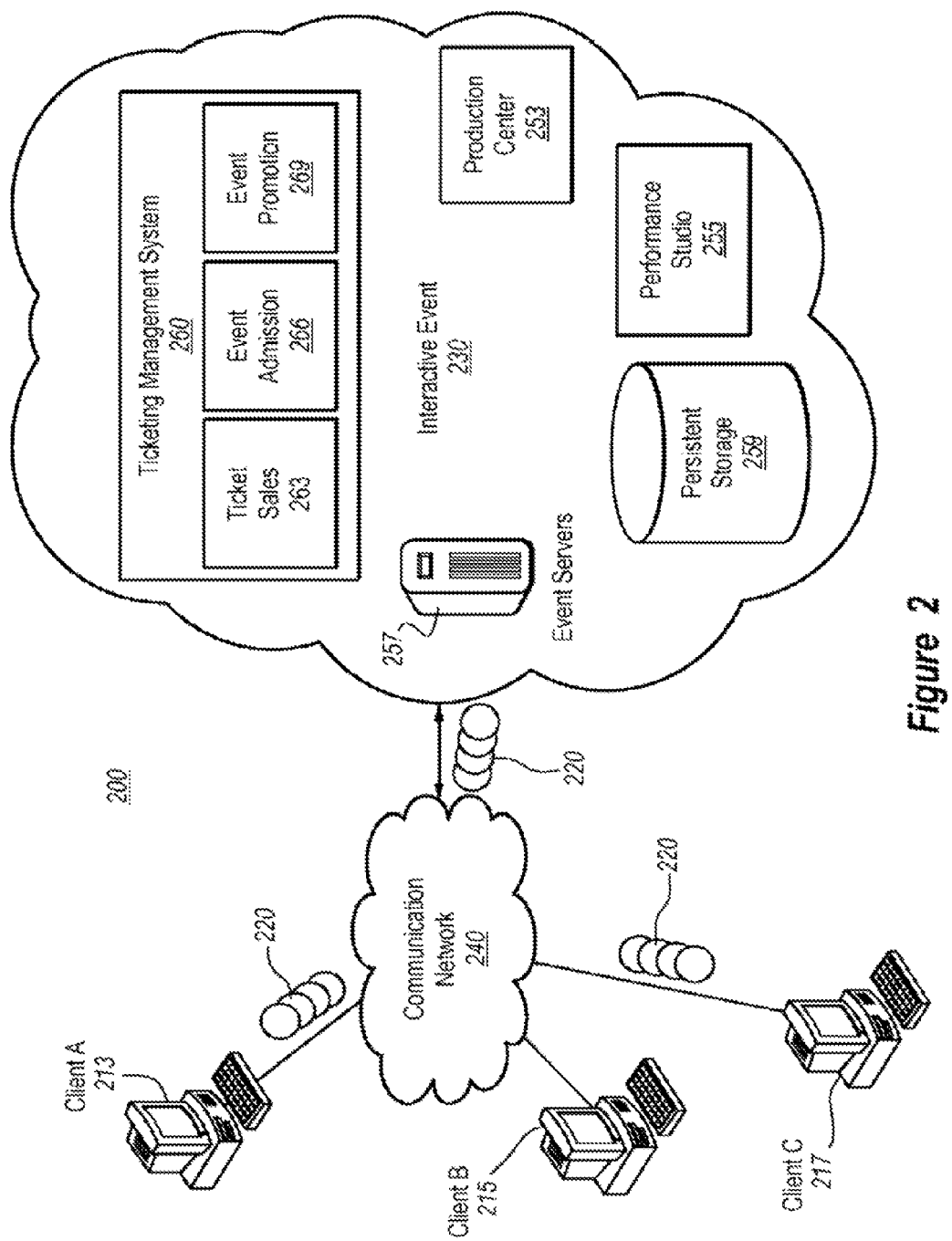
FIG. 2 illustrates a block diagram view of computer systems in a multi-client online interactive event environment in accordance with at least one embodiment.

In addition, the various embodiments depicted in FIG. 2 through FIG. 10 are block diagrams and flow diagrams that illustrate in more detail the present invention. The block diagrams often illustrate certain embodiments of modules for performing various functions of the present invention. In general, the represented modules include therein executable and operational data for operation within a system as depicted in FIG. 2 in accordance with the present invention. The flow diagrams are useful in describing a method and/or various operations by enabling one skilled in the art to develop programs, including instructions to carry out the methods on suitably configured computer systems and electronic devices. Various operations of the system may be described as multiple discrete operations in turn, in a manner that may be helpful in understanding embodiments of the present invention; however, the order of description should not be construed to imply that these operations are order dependent.

As used herein, the term executable code, or merely "executable," is intended to include any type of computer instruction and computer executable code that may be located within a memory device and/or transmitted as electronic signals over a system bus and/or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices. Similarly, operational data may be identified and illustrated herein within modules, and may be embodied in any suitable form and/organized within any suitable type of data structure. The operational data may be collected as a single data set, or may be distributed over different locations including over different storage devices, and may at least partially exist merely as electronic signals on a system bus and/or network.

Figure 1:
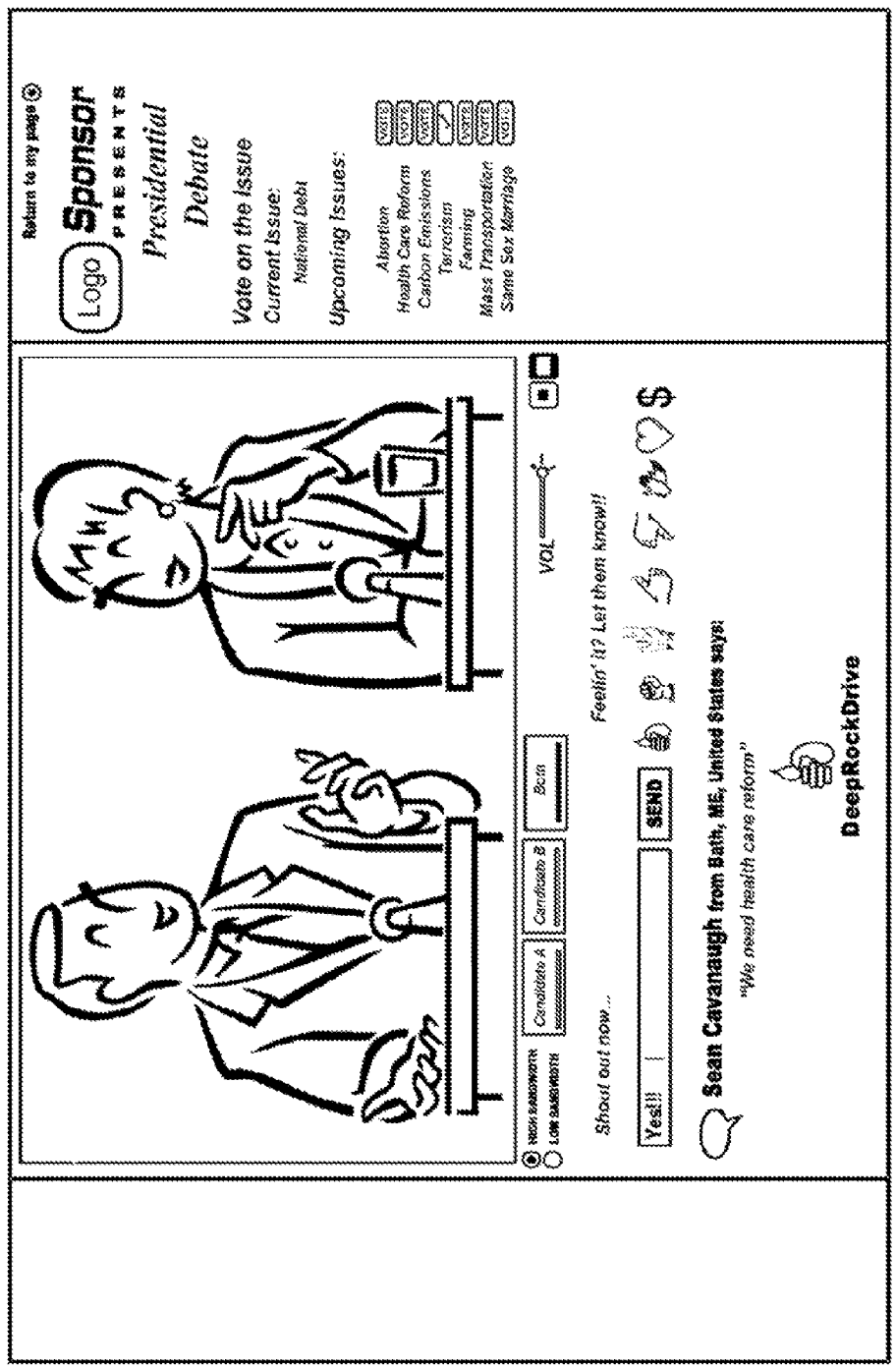
FIG. 1 illustrates a block diagram view of a portion of an interactive client interface of an online interactive event environment during presentation of the event in accordance with various embodiments of the present disclosure.

Referring now to FIG. 1, a block diagram view of a portion of an interactive client interface 100 of an online interactive event environment is illustrated showing portions of the presentation during an interactive event in accordance with various embodiments of the present disclosure. The illustrated interactive client interface 100 incorporates a variety of user interfaces 1410, 1420, 1430, and 1440 into the event presentation, each of which are discussed and described in greater detail in FIGS. 14A, 14B, 14C, and 14D below.

The interactive client interface 100, in one embodiment, may include a video presentation of the event, and audio presentation of the event and/or some combination thereof. In one embodiment, the video presentation may be individually selected by online audience members. Selection allows the event attendee to choose the position of their virtual seat in the event and/or performance hall. For example, in the illustrated embodiment an audience member may have a specialized interest in watching a drummer and/or lead singer, David, or in watching the entire live presentation of the band, Disturbed. In various embodiments, the selection of the video presentation may include choice of camera angle, perspective, and/or relative distance (e.g., zoom in/out).

In addition, the illustrated embodiment also shows event sponsorship of the event. Accordingly, this sponsorship may be sold in accordance with a variety of advertising mechanisms, including but not limited to per event, per candidate, per minute, per impression, or some combination thereof. In one embodiment, an event sponsor may present customized logos and marketing material targeted for the audience of the event. On embodiment provides promotional links on the presentation page of event. When clicked, another window may open without interrupting the stream. Alternatively, a sponsorship link may change the look of the event interface. Other more subtle methods of marketing and/or event promotion are also considered within the scope of the disclosure include use of a watermark and/or background images and/or desktop/window wallpaper of marketing and/or promotional materials.

Referring now to FIG. 2 a block diagram of a portion of computer systems in a multi-client online interactive event environment 200. The environment 200 includes both a variety of operating systems and a variety of network devices. Operating systems within a given environment 200 may include, but are not limited to, multiple clients (Event server 257, Client A 213, Client B 215, and Client C 217) that may attach via communication network 240 to a interactive event platform 230 using a variety of consumer devices including, but not limited to, general purpose computer systems, personal digital assistants, digital media players, mobile telephones, video equipment, application specific devices, and other digital communication devices. A more detailed description of the various operating environments (e.g., 213, 215, 217, and 257) typically used in the interactive event environment 200 are described in greater detail in FIG. 3. A performance studio 255 provides event content, such as executable code and operational data 220 to the production center 253, the servers 257, and/or the persistent storage 259, directly and indirectly.

In one embodiment, the interactive event platform 230 includes a ticketing management system 260 to promote 269, sell 263, and admit 266 clients to the event. In one embodiment, the ticketing management system 260 evaluates the value of an event and artificially establishes ticket sales thresholds including size of event and various event promotion thresholds to help determine the type of promotion used for an event.

Events are configured with two parameters, ticket limit and scarcity limit. As used herein, the term ticket limit is intended to indicate when a predetermined quantity of tickets, free or paid for fundraising and/or revenue purposes are granted until the event becomes "sold out" and new tickets are not available. In one embodiment the ticket limit may include a stage variable limit, which would allow for an event to expand, but only after certain sales thresholds have been satisfied. As used herein, the term scarcity limit is intended to indicate the relative count of remaining tickets to the ticket limit after a quantity tickets are granted. In one embodiment, promotion messages with the relative event scarcity limit are displayed to encourage additional sales.

FIG. 2 also illustrates at least one computer system 257 in which executable and operational data 220, operating in accordance with various embodiments of the present invention, may be hosted and transmitted to one or more stations in a communication network 240. The communication network 240 may comprise a local area network (LAN) and/or a wide area network (WAN). Each network may be wired, wireless, or some combination thereof. The communication network 240 may also comprise an interconnected system of networks, one particular example of which is the Internet and the World Wide Web supported on the Internet.

Figure 3:
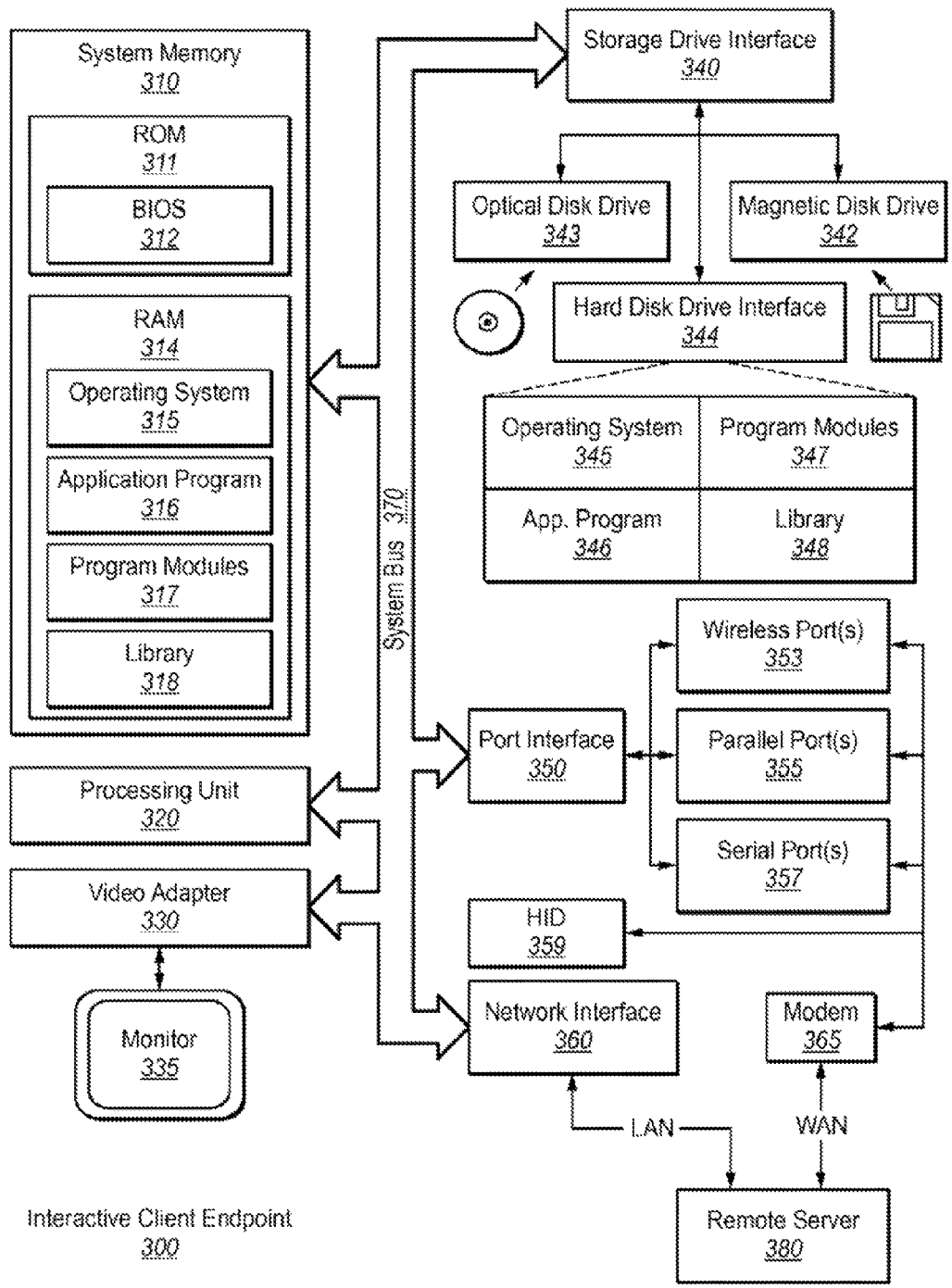
FIG. 3 illustrates a block diagram view of components contained in an interactive client system configured in accordance with at least one embodiment.

Referring now to FIG. 3, a computer system is shown for implementing at least one embodiment of the invention, the system including a computing device 300 in which executable and operational data may be hosted and transmitted to one or more interactive stations via a communication network of the previously described online interactive event environment 200. Computing device 300 may be configured as a client, a server, a mobile device and or any other computing device that interacts with data in a network based collaboration system.

In a very basic configuration, computing device 300 typically includes at least one processing unit 320. In one embodiment, the processing unit 320 includes at least one processor. As such, the term "processor", as used herein, should be interpreted to mean an individual processor, firmware logic, reconfigurable logic, a hardware description language logic configuration, a state machine, an application-specific integrated circuit, a processing core co-disposed in an integrated circuit package with at least one other processing core and/or component, or combinations thereof.

The processing unit 320 may be operably connected to system memory 310. Depending on the exact configuration and type of computing device, system memory 310 may be non-volatile memory 311 (such as ROM, flash memory, etc.), volatile memory 314 (such as RAM), or some combination of the two. System memory 310 typically includes Basic Input/Output System (BIOS) firmware code 312, an operating system 315, one or more applications 316, and may include program modules and data 317. A configuration library 318 (e.g., registries), which contain code and data to be shared and changed in a modular or database fashion to provide services to applications 316 and programs 317 is also often included in system memory 310.

Computing device 300 may have additional features or functionality. For example, computing device 300 may also have a dedicated graphics rendering device, such as video adapter 330 coupled with at least one display monitor 335. Computing device 300 may also have a variety of human input device(s) (HID) 359 such as keyboard, mouse, pen, voice input device, touch input device, and the like. In a broader sense, human input device (HID) 359 may also include various output devices such as a display monitor 335, speakers, printer, and the like. Computing device 300 may utilize a variety of ports via port interface 350 to share data including wireless ports 353, parallel ports 355, and serial ports 357. Each of these port types may include further varieties, for example serial ports may include a Universal Serial Bus (USB) port and/or a FireWire/IEEE 1394 port.

In various embodiments, computing device 300 may also include a storage drive interface 340 for communication with additional data storage devices (removable and/or non-removable) such as, for example, magnetic disk drives 342, optical disk drives 343, hard disk drives 344, tape drives, and other storage devices. Such additional storage is illustrated in FIG. 3 by removable magnetic storage 341 and removable optical storage 349 and non-removable storage (hard disk drive 344).

Computer storage media may include volatile and nonvolatile, removable and non-removable media implemented in any method or technology for storage of information, such as computer readable instructions, data structures, program modules, or other data. System memory 310, removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be used to store desired information, such as operating system 345, one or more applications 346, programs 347, and/or registries and configuration libraries 348 accessible to computing device 300.

Computing device 300 may also contain a communication connection via port interface 350 and/or network interface card 360 that allows the device 300 to communicate with other remote computing devices 380, such as over a communication network. The communication network may comprise a local area network (LAN) and/or a wide area network (WAN). Each network may be wired or wireless or combination thereof. The communication network may also comprise other large scale networks including, but not limited to, intranets and extranets, or combinations thereof. In one embodiment the communication network is an interconnected system of networks, one particular example of which is the Internet and the World Wide Web supported on the Internet.

A variety of configurations may be used to connect the computing device 300 to the remote computing devices 380. For example, although modem 365 is illustrated as connecting to the remote computing device 380, a remote server, via a WAN and network interface 360 is illustrated as connecting via a LAN, both the network interface 360 and/or the modem 365 may just as well be coupled to other large scale networks including, but not limited to, a global system of interconnected computer networks (internet), various intranets and extranets, or combinations thereof.

The information transmitted as data across the previously discussed communication connections are examples of communication media. Communication media may typically be embodied by computer readable instructions, data structures, program modules and or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Although many of the examples refer to computing devices with a single operating system, file system and configuration library, the concepts, principles, and examples disclosed below may be extended to provide interactive event functionality across at least one and/or many operating systems, file systems, and/or configurations libraries (e.g., registries). Accordingly, it is contemplated that the principles described herein may be applied to these and other computing systems and devices, both existing and yet to be developed, using the methods and principles disclosed herein.

Figure 4:
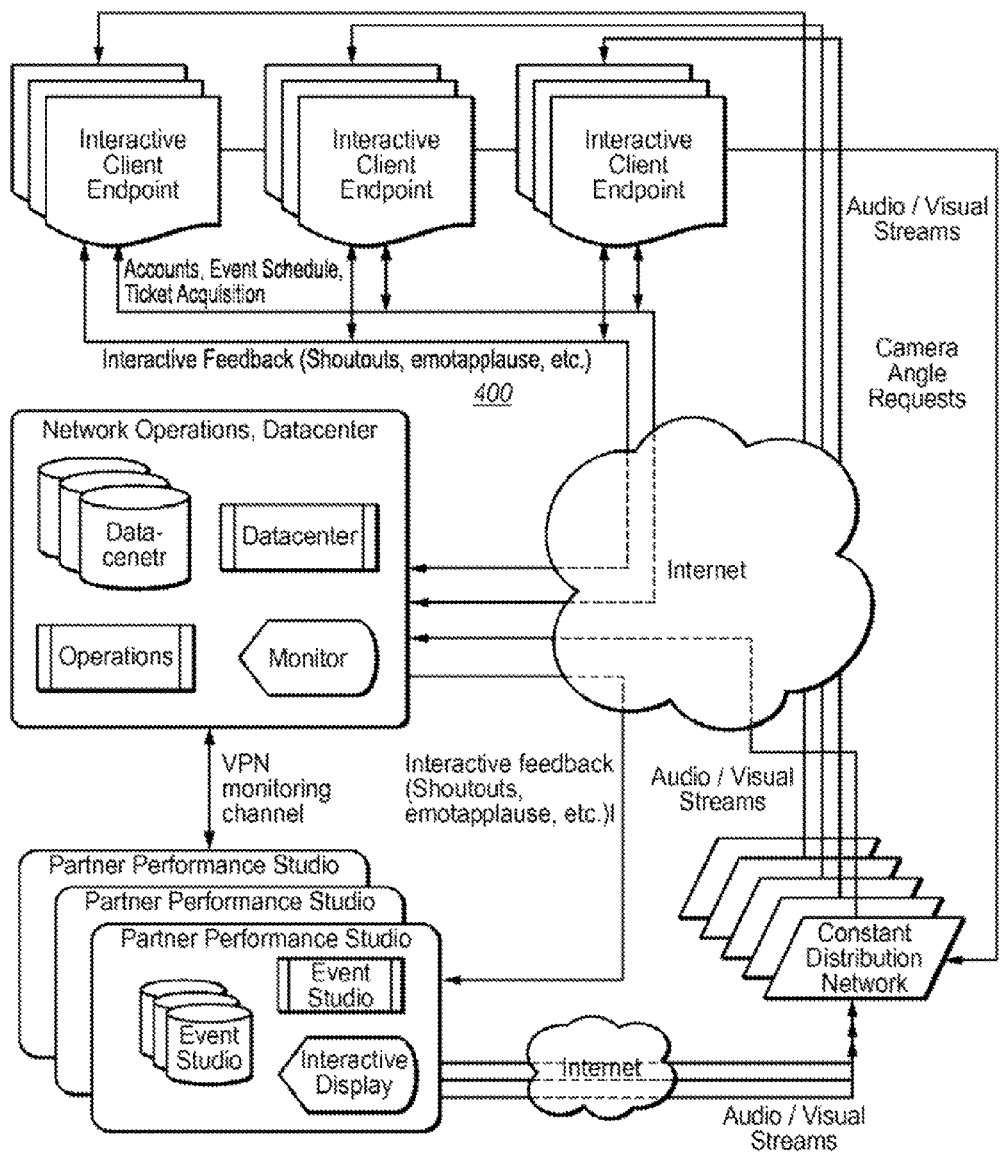
FIG. 4 illustrates a block diagram view of computer systems in an online interactive event environment in accordance with at least one embodiment.

Referring now to FIG. 4, a block diagram of various computer systems in an online interactive event environment 400 is shown. Computer systems useful for data evaluation, categorization, and presentation of interactive events are shown in accordance with various embodiments of the present disclosure. The online interactive event environment 400 includes both a variety of operating environments and a variety of network devices. Operating environments within the online interactive event environment 400 may include, but are not limited to, multiple interactive client endpoints that may attach via a communication network, such as the internet, to a production center and/or one or more performance studios. In one embodiment, the event origination center and/or production center includes network operations and a datacenter. In one embodiment, the event origination center and/or performance studio includes an event studio, an event database, an event interface, and an interactive display. The event origination center and/or production center and/or performance studio may be separately connected via private and/or public communication networks or via a virtual private network across a public communication network, such as the internet. Additionally, in one embodiment, the event origination center and/or production center and/or performance studio may physically be located at the same location.

An interactive client endpoint may represent at least one and/or a variety of consumer devices including, but not limited to, general-purpose computer systems, personal digital assistants, digital media players, mobile telephones, mobile smart devices video equipment, application specific devices, and other digital communication devices.

Event origination centers and/or performance studios provide executable code and operational data to the interactive client endpoints, directly and indirectly via the production center and/or network operations center. Interactive client endpoints, in accordance with various embodiments, can be visitors of the event website, people who own and/or purchase and/or are given and/or win a ticket, employees of the event company running the web site, or any other types of people and/or devices that may participate in the interactive online event. Various multimedia devices may be used to upload a rich variety of media information for and/or about an event to the event profile. For example, multiple cameras or webcams may be used to collect video images of an event, conduct separate web interviews, and/or provide a video preview of an event. Likewise, multiple microphones may be used to collect sound from the event and/or associated interviews and/or advertisements.

In one embodiment, the audience member at the interactive client endpoint joins an ongoing event and initiates interactivity with the event by typing a message, clicking or otherwise choosing an emotapplause image, voting for event presentation lists, selecting a camera angle and or some other method of indicating the message they would like to send. The messages are then sent to a centralized internet web service that adds user information about that audience member such as their name, image, location, source, etc. That information is then stored in a central database and/or data store such that the web service can index, search, log and recall each request, and or aggregate totals of requests.

Interactive client applications can then periodically issue requests for the current summary state of the interactivity information. That information includes a set of recent shout out messages and/or their related metadata, the current aggregate information for emotapplause items, current voting topics and/or voting choices, and/or any other status information that is helpful for the client to be able to process this data. Because of the potential quantity of requests coming from audience members, various caching mechanisms can be used to reduce the overhead spent gathering this information on every request. To maintain relevancy it is important that the information sent out to clients be very current, so as to maintain the feeling of interactivity at the event. In one embodiment, shout out messages are not allowed to be more than about 30 seconds old (time they were sent from audience member) and preferably represent the most recent messages received by the system. The response to the interactive client may be encoded in at least one of a variety of different formats, including but not limited to, XML, JSON, CSV, and the like.

In one embodiment, when the interactive audience client and/or event origination center and/or performance studio client initially receives the data, they present the information to the candidate(s)s and/or audience members in an appropriate way. For the candidate(s)s, that may be showing the name of the audience member, their image, location and the shout-out message itself in an interesting animation. Some additional options for emotapplause and shoutouts are described below in greater detail with reference to FIG. 14A and FIG. 14C.

Figure 5:
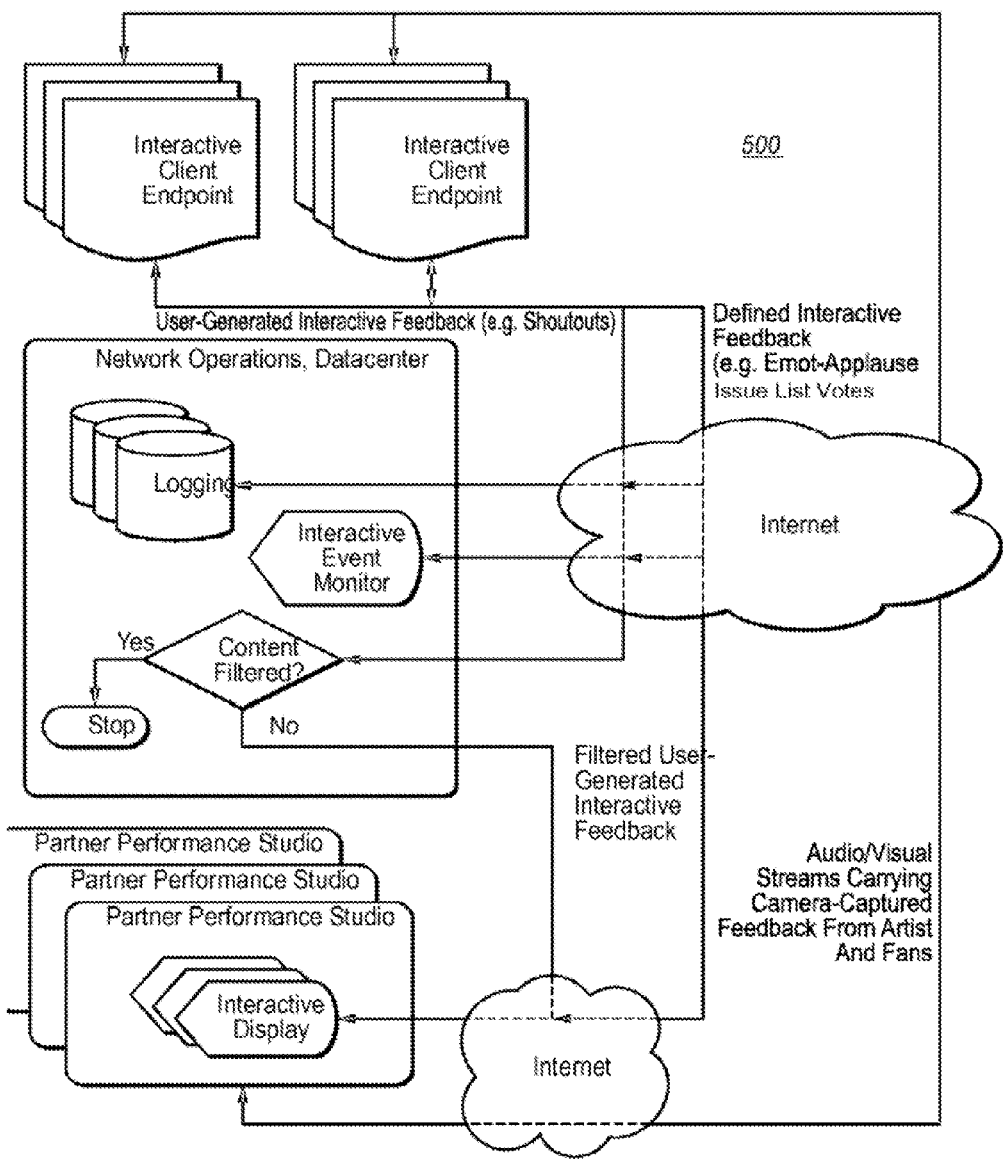
FIG. 5 illustrates a block/flow diagram view of a portion of computer systems to filter feedback in an exemplary online interactive event environment in accordance with at least one embodiment.

Referring now to FIG. 5, a block and flow diagram view of a portion of a system 500 configured to filter feedback in an exemplary online interactive event environment is illustrated in accordance with at least one embodiment. The system 500 includes one or more event origination centers and/or performance studios for producing the underlying content for the event, a production center and/or network operations center to produce and monitor the interactive event, and a plurality of interactive client endpoints to generate the interactive content associated with the underlying content of the event.

Each of the one or more interactive client endpoints are configured to receive the data transmitted from the performance studio and transmit user-generated interactive feedback associated with the interactive event back to the production center and/or network operations center and/or the event origination center and/or performance studio. In one embodiment, the various multimedia streams received by the client include camera captured feedback from candidates and audiences in the event audience. Accordingly, the user-generated interactive content transmitted by the client may include voting results, shout outs, emotapplause, and other feedback solicited and/or generated from the live watching audience and/or the online audience.

In various embodiments, the event origination center and/or performance studio may be a customized interactive center and or a traditional event center upgraded with applicable interactive equipment. In one embodiment, each event origination center and/or performance studio includes at least one interactive display to receive interact content, such as voting results, shout outs, emotapplause, and other feedback from the watching online audience.

The at least one production center and/or network operations center is configured to control a variety of network operations and provide a datacenter for the interactive event. In one embodiment, the production center and/or network operations center monitors the flow of content to the interactive clients to maintain a log of the event and ensure quality reception of the content sent to the client. Quality levels may be adjusted in a variety of ways including bandwidth throttling, data compression, refresh rate manipulation, and adjustment of packet size and/or frequency. In one embodiment, the production center and/or network operations center may also receive the content transmitted by the interactive client for additional processing, including interactive content sampling, filtering, and transformation.

In one embodiment, content may be filtered prior to transmission to the event origination center and/or performance studio. Filtered content may merely be removed from the feedback stream. Alternatively, filtered content may be replaced with alternative content expressing a similar intent, but in a more acceptable manner. Another form of filtering includes the relative weighting of received responses from the interactive client endpoints. This allows the candidate(s) to get a feel for the response of the audience. It will be appreciated by those of ordinary skill in the art and others, that a wide variety of alternate and/or equivalent implementations of interactive content filtration may be substituted for the specific embodiment of filtering as shown.

Moreover, the illustrated configuration of the system 500 may also include a wide variety of alternate and/or equivalent implementations. For example, in at least one embodiment, the event origination center and/or performance studio and the production center and/or network operations center may be the same location. Moreover, in at least one embodiment, some of the interactive clients may also be co-located at the event origination center and/or performance studio and/or the production center and/or network operations center.

Figure 6:
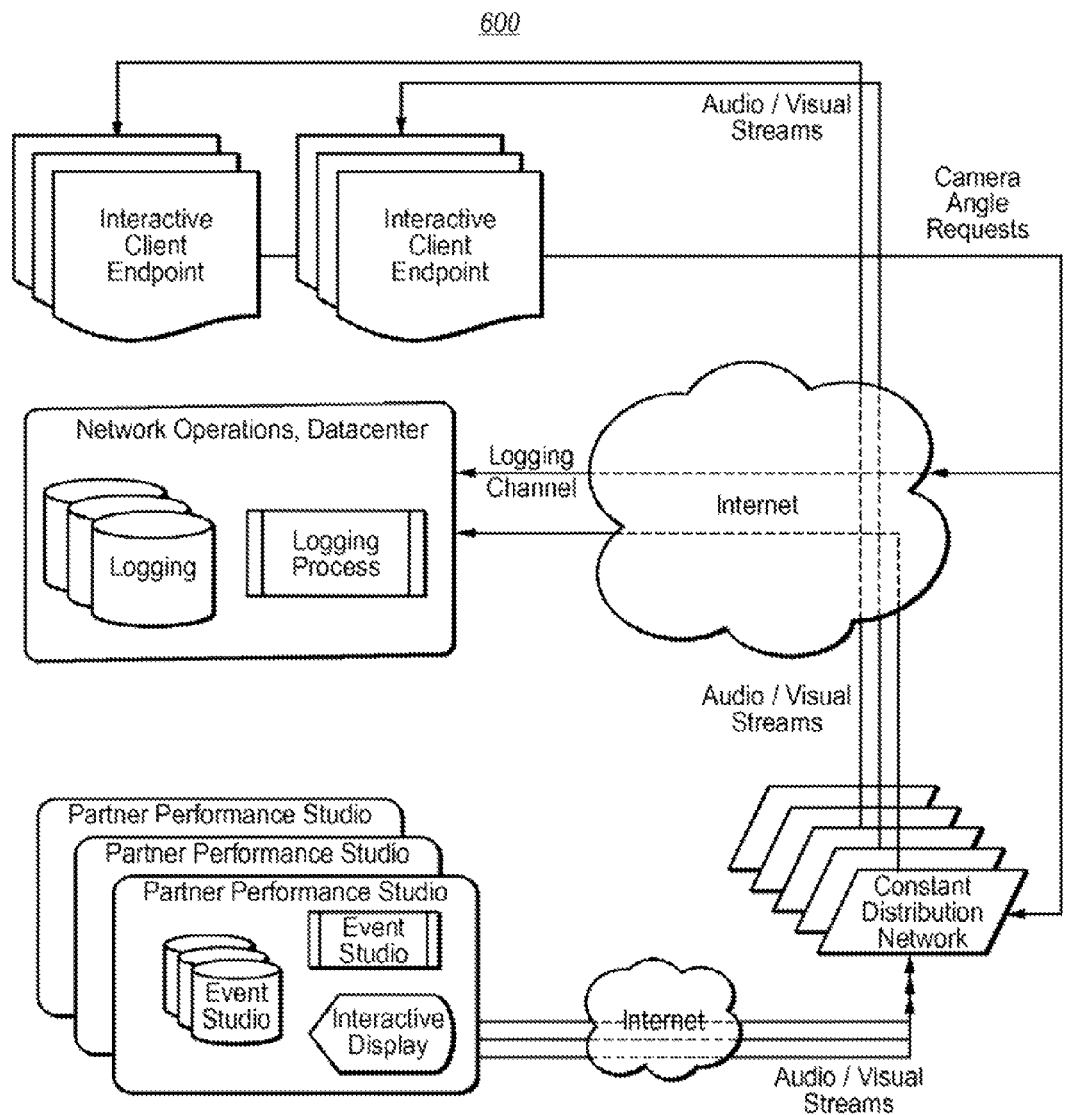
FIG. 6 illustrates a block/flow diagram view of a portion of computer systems in an exemplary online interactive multi-channel event environment in accordance with at least one embodiment.

Referring now to FIG. 6, a block diagram of various computer systems in an online interactive event environment 600 is shown. Computer systems useful for data evaluation, categorization, and presentation of interactive events are shown in accordance with various embodiments of the present disclosure. The online interactive event environment 600 includes both a variety of operating environments and a variety of network devices. Operating environments within the online interactive event environment 600 may include, but are not limited to, multiple interactive client endpoints that may attach via a communication network, such as the internet, to a production center and/or one or more event origination centers and/or performance studios. The online interactive event environment 600 may also include a content distribution network for receiving camera angle requests and transmitting requested audio/visual streams. The online interactive event may also transmit other interactive data, such as the camera angle requests, political party affiliations and/or geographical information to the production center, network operations center and/or the content distribution network.

In one embodiment, the event origination center and/or production center includes network operations and a datacenter including a logging process for monitoring the event. The production center is configured to transceive audio/visual streams and to receive a logging channel of the event. In one embodiment, the event origination center and/or performance studio includes an event studio, an event database, an event interface, and at least one interactive display. In one configuration, each channel at a designated bandwidth level may be associated with a camera and/or an interactive display. In one embodiment, a lower bandwidth stream of the event is sampled from the high bandwidth stream of the event to reduce the number of cameras necessary. As illustrated, the production center and/or network operations center and/or performance studio may be separately connected via a private communication network or via a virtual private network across a public communication network, such as the internet.

An interactive client endpoint may represent a variety of consumer devices including, but not limited to, general purpose computer systems, personal digital assistants, digital media players, mobile telephones, smart mobile devices, video equipment, application specific devices, and other digital communication devices.

Event origination centers, and/or performance studios provide executable code and operational data to the interactive client endpoints, directly and indirectly via the production center. Interactive client endpoints, in accordance with various embodiments, can be visitors of the event website, people who own and/or purchase a ticket and/or win a ticket and/or are given a ticket, employees of the production and/or event company running the web site, or any other types of people or device that may participate in the interactive event. Various multimedia devices may be used to upload a rich variety of media information for or about an event to the event profile. For example, multiple cameras or webcams may be used to collect video images of an event, conduct a separate web interviews, and/or provide a video preview of an event. Likewise, multiple microphones may be used to collect sound from the event and/or associated interviews or advertisements.

In one embodiment, the audience member at the interactive client endpoint joins an ongoing event and initiates interactivity with the event by typing a message, clicking or otherwise choosing an emotapplause image, voting for event presentation lists, selecting a camera angle, or some other method of indicating the message they would like to send. The messages are then sent to a centralized internet web service that adds user information about that audience member such as their name, image, location, source, etc. That information is then stored in a central database or data store such that the web service may index, search, log and recall each request, or aggregated totals of requests.

Interactive client applications can then periodically issue requests for the current summary state of the interactivity information via a logging channel. That information includes a set of recent shout out messages and their related metadata, the current aggregate information for emotapplause items, current voting topics and voting choices, and any other status information that is helpful for the client to be able to process this data.

Figure 7:
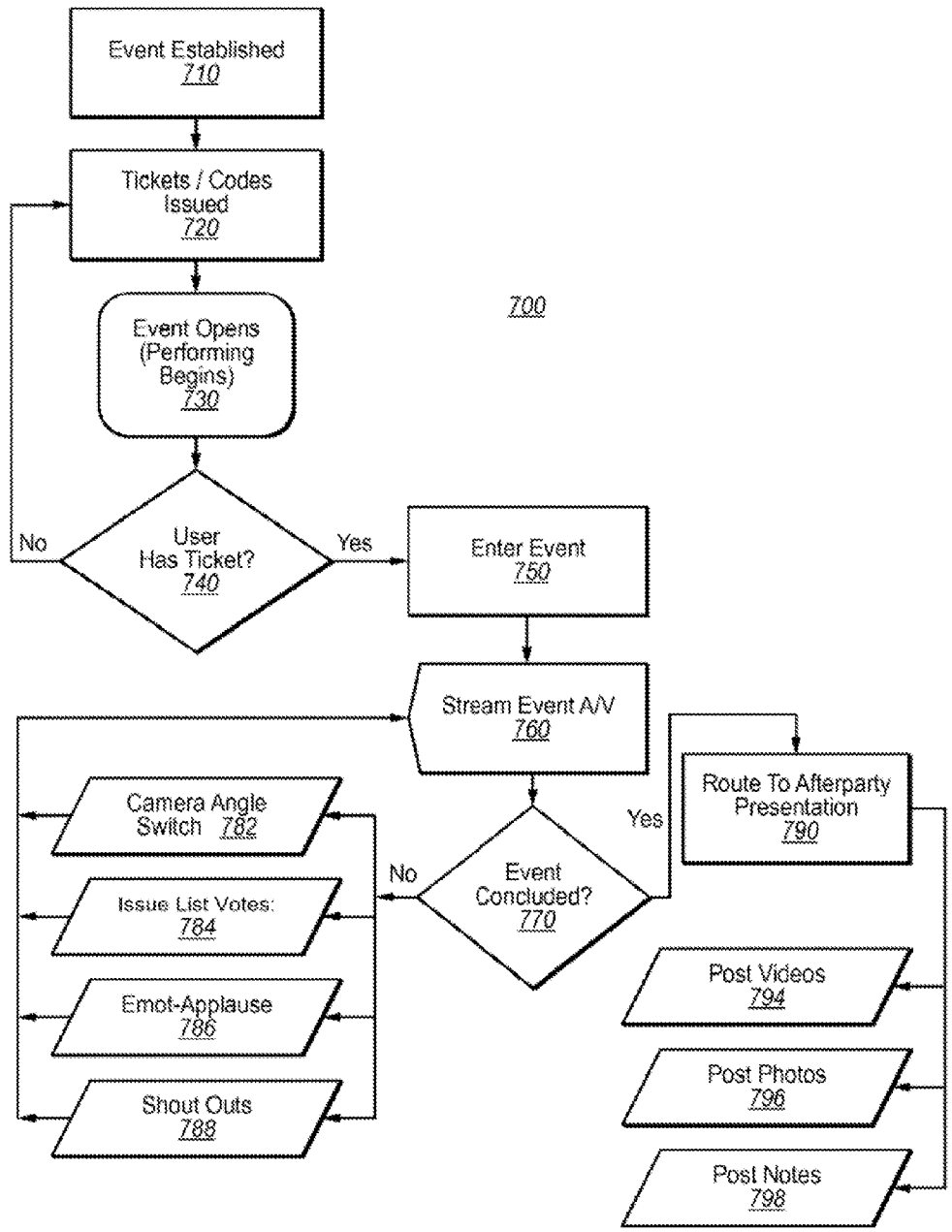
FIG. 7 illustrates a flow diagram view of a portion of a method of operation for interactive event data evaluation, categorization, and presentation in accordance with at least one embodiment.
Figure 8:
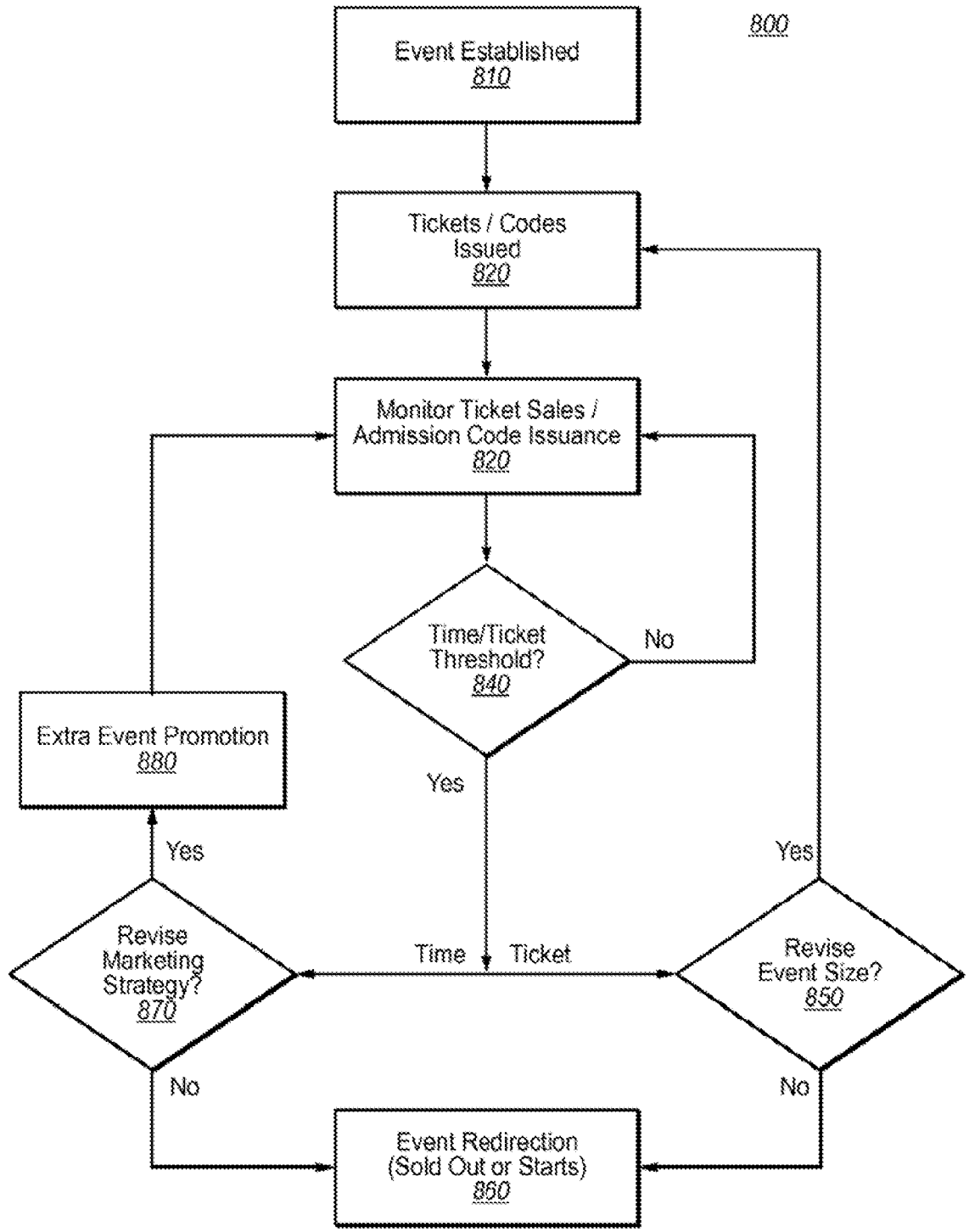
FIG. 8 illustrates a flow diagram view of a method of a portion of operation for ticketing data evaluation, categorization, and promotion for an interactive online event in accordance with at least one embodiment.
Figure 9:
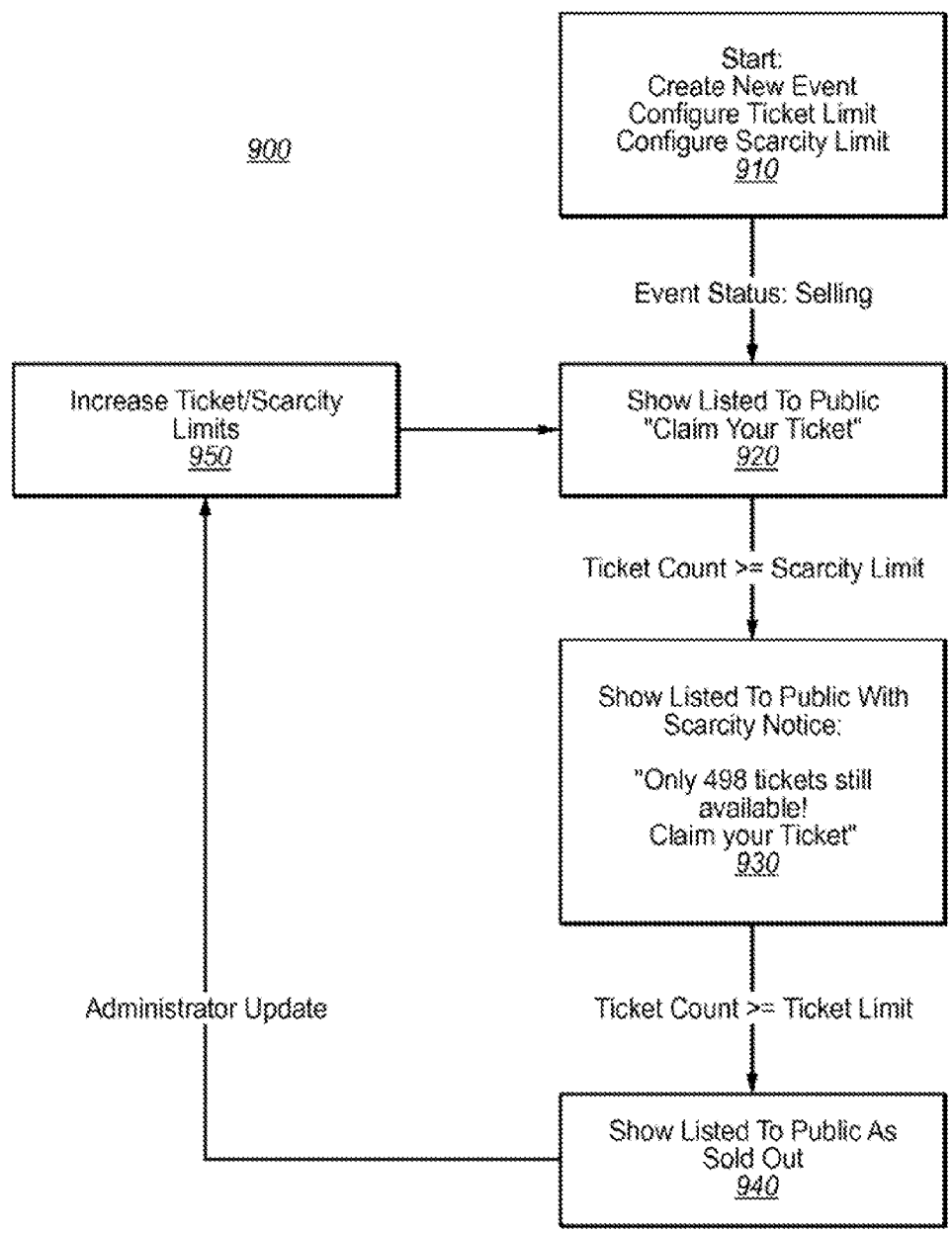
FIG. 9 illustrates a flow diagram view of a method of a portion of operation for ticket scarcity data evaluation, categorization, and promotion in accordance with various embodiments.
Figure 10:
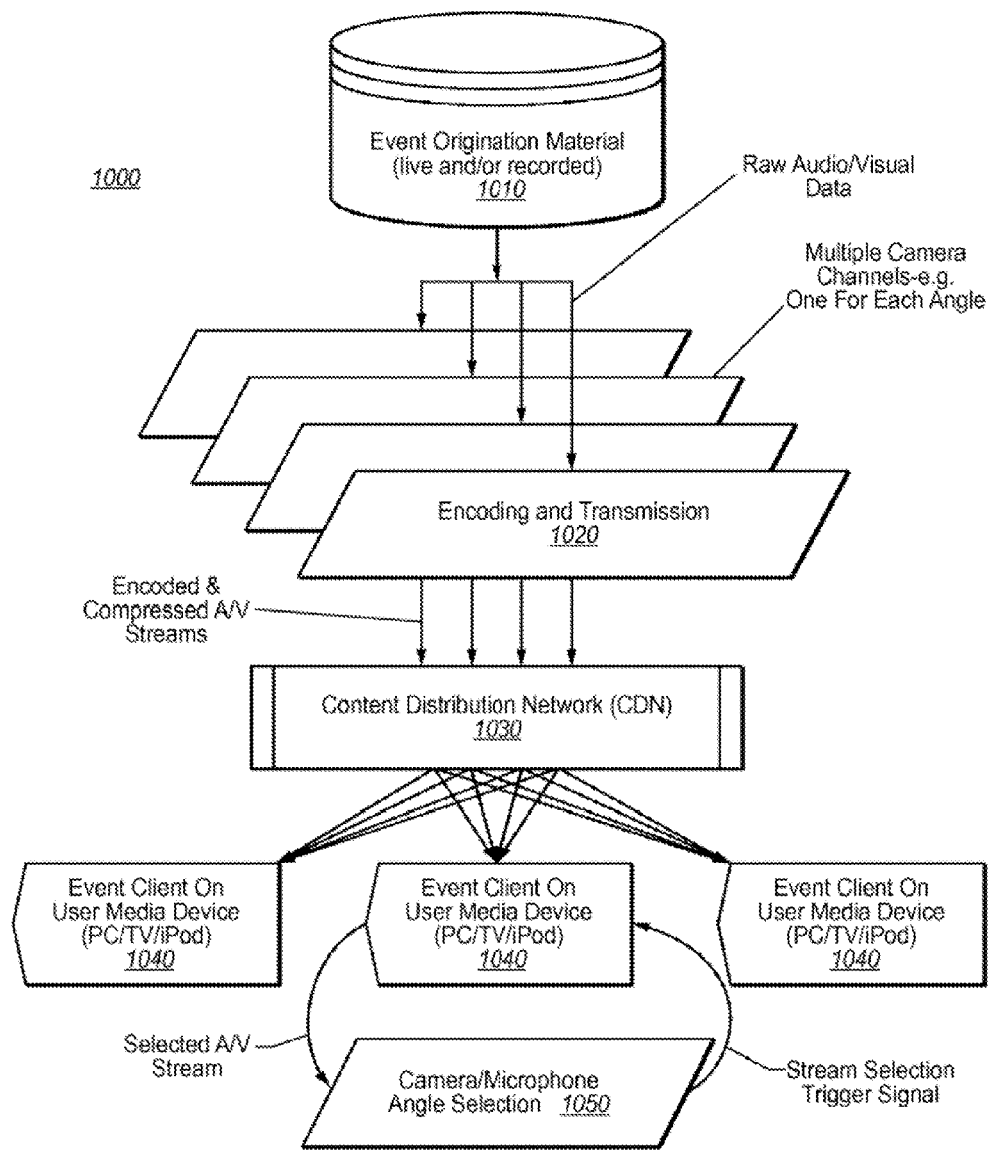
FIG. 10 illustrates a block/flow diagram view of a portion of computer systems to distribute content across multiple channels in an exemplary online interactive event environment in accordance with at least one embodiment.

Turning now to FIGS. 7-10, methods and various operations of the interactive event system, in accordance with at least one embodiment, are described in terms of firmware, software, and/or hardware with reference to flowcharts and/or flow diagrams. More specifically, FIG. 7 is a flow diagram view illustrating a portion of a method of operation for interactive event data evaluation, categorization, and presentation in accordance with at least one embodiment. FIG. 8 is a flow diagram view illustrating a method of a portion of operation for ticketing data evaluation, categorization, and promotion for an interactive online event in accordance with at least one embodiment. FIG. 9 is a flow diagram view illustrating a portion of a method of operation for ticket scarcity data evaluation, categorization, management, and event promotion in accordance with at least one embodiment. FIG. 10 is a block/flow diagram view illustrating a portion of a method of distributing content across multiple channels in an online interactive event environment including various computer systems in accordance with at least one embodiment.

Describing a method and/or various operations by reference to a flowchart enables one skilled in the art to develop programs, including instructions to carry out the methods on suitably configured computer systems and electronic devices. In various embodiments, portions of the operations to be performed by an electronic device or computer system may constitute circuits, general purpose processors (e.g., microprocessors, micro-controllers, an ASIC, or digital signal processors (DSPs)), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured electronic communication device, such as a computer, executes the instructions from a storage medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a device causes the processor of the computer to perform an action or a produce a result.

Referring now to FIG. 7, a flow diagram view of a portion of a method of operation 700 for interactive event data evaluation, categorization, and presentation is illustrated in accordance with at least one embodiment. Initially the event is established in block 710. The established event may include information about the candidate(s)s at the event, size (number of available tickets), ticket sales thresholds, anticipated playlists, online location of the event, and other particulars about the event. In block 720 tickets or admission codes for the event are issued based on event information.

Once the event opens in block 730, such as the beginning of a performance, the method 700 begins to determine which interactive clients may have access to the data being transmitted. Query block 740 handles this by determining whether the soliciting client has ticket or admission code. If not then the soliciting client is encouraged to purchase a ticket in block 720. If the client has a ticket, then they are allowed into the event in block 750. Upon registering with the event coordinators, the interactive client will be allowed to receive the event stream in block 760, including at least one integrated multimedia audio and video stream from the performance studio. In one embodiment, the integrated multimedia audio and video stream includes multiple synchronized streams, one for each camera angle.

Monitoring block 770 determines whether the event has concluded. If not concluded, the method 700 continues to accept and process interactive inputs from the interactive client, such as requests to change camera angles 782, voting information 784 including votes regarding upcoming playlists, emotapplause 786, and shout outs 788. If the event has concluded, the method 700 directs interactive clients towards after party presentations 790 associated with the event, which may include post videos 794, post photos 796, post notes 798, and other post event offerings. In one embodiment, the post videos 794 may include the entire event stream for review of the interactive client. In one embodiment, the post photos 796 may include a collection of images from the event and/or publicity shots of the candidate(s)s at the event. In one embodiment, the post notes 798 may include links to additional information about the candidate(s)s at the event, including future concerts that may be available.

Figure 11A:
FIGS. 11A and 11B illustrate block diagram views of portions of interactive event promoter interfaces during establishment of an event in accordance with various embodiments of the present disclosure.
Figure 11B:

Referring now to FIG. 8, a flow diagram view of a portion of a ticket scarcity management system 800 configured to create, evaluate, and categorize ticketing data and to promote an event in accordance with at least one embodiment. Initially the event is established in block 810. The established event may include information about the candidate(s)s at the event, size (number of available tickets), ticket sales thresholds, anticipated playlists, online location of the event, and other particulars about the event. In block 820, tickets or admission codes for the event are issued based on event information. These initial setup activities for an event are generally not visible to the public. Portions of interactive event promoter user interfaces are illustrated in FIGS. 11A and 11B and are described in greater detailed below.

Figure 12A:
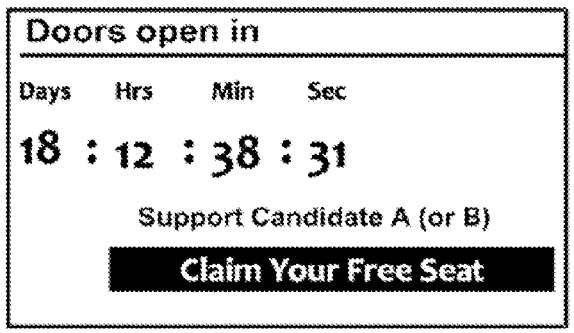
FIG. 12A-12C illustrate block diagram views of portions of user interfaces associated with pre-event ticketing in accordance with various embodiments.
Figure 12B:
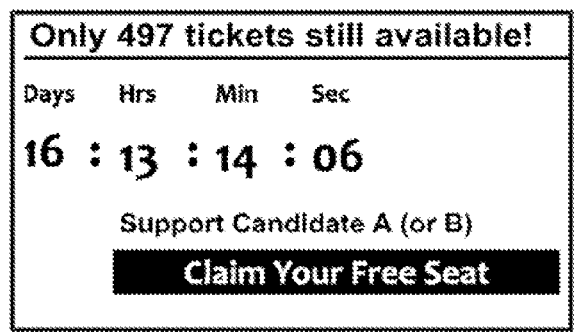
Figure 12C:

Ticket sales and/or admission code issuance are monitored in block 830 by the ticket scarcity management system 800 once the event is available to the public for tickets. Portions of an interactive event audience user interface where tickets for an event are initially available/on sale to the public is illustrated in FIG. 12A and described in greater detail below. Once a given scarcity threshold has been reached and detected by the ticket scarcity management system 800 in query block 840, a corrective action may be taken by either the event organizer, promoter, or automatically by the ticket scarcity management system 800. For example, if tickets have sold too fast or too slow the event size may need to be modified in query block 850. If the size of the event is increased additional admission codes and/or tickets are issued by the ticket scarcity management system 800 in block 820. In one embodiment, if the size of the event needs to be decreased then previously issued but unsold tickets may be invalidated and/or deleted to desired levels. Alternatively, if the ticket limit has been reached and the event has sold out, then sales are redirected in block 860 by the ticket scarcity management system 800. An example of this type of redirection is illustrated in FIG. 12C and is described in greater detailed below.

When a time threshold is reached in query block 840 the ticket scarcity management system 800 determines whether corrective action is necessary. In one embodiment this corrective action may include modification of the event marketing strategy in query block 870. In one embodiment, the modified marketing may include adding extra event promotion in block 880. Extra event promotion may include a variety of additional electronic marketing approaches, such as adding a message counter to the user interface, where the counter displays the number of remaining tickets available before the ticket limit is reached, as illustrated in FIG. 12B and described in greater detailed below. In various embodiments, this message counter may be included in a popup/widget on the ticketing interface associated with the event and/or within electronic correspondence sent to potential and/or existing audience members. In one embodiment, the public does not know what the relative scarcity level is, as they can't tell the total size of the available ticket pool.

In one embodiment, adding the extra event promotion in block 880 may include a variety of different marketing systems including offering purchasers a "Buy One Get N Free" system. One configuration parameter on an event is the number of promotion tickets that are associated with each real ticket. When this parameter is configured to zero, promotion tickets are disabled. When this parameter is set to a non-zero value, N, if a user buys a ticket (e.g., not redeeming an admission code for free admittance) they are granted N free tickets to give to their friends, as illustrated in FIG. 13B and described in greater detailed below.

In one embodiment, the user can invite as many friends as they want via a social network, such as Facebook.com, or via other form of electronic correspondence, to join them at the show, as illustrated in FIGS. 12A and 12B described in greater detailed below. The first N users that respond to the invitations are granted free tickets. The remaining responding users are told they missed out on the free ticket, but are then given an offer to purchase a ticket. This mechanism is designed to encourage people to invite a bunch of their friends to help spread the word of an event virally.

Referring now to FIG. 9, a flow diagram view of a portion of a method 900 of operation for ticket scarcity data evaluation, categorization, and event promotion is shown in accordance with at least one embodiment. In block 910, a new event is created including configuration of a ticket limit and a scarcity limit. As previously described, a ticket limit represents the number of tickets available for the event and a scarcity limit indicates the relative count of remaining tickets to the ticket limit. Once the parameters of the event are established, the event ticketing status is set to selling. The event is then listed for public review and each potential attendee is invited to "claim Your Ticket" in block 920. So long as the ticket count remains larger than the scarcity limit, promotion of the event is limited to indicating the number of publicly available tickets as illustrated in block 930. Once it is determined that the ticket count is greater than or equal to the ticket limit, the method 900 indicates that the event is sold out in block 940. At this point the administrator may update the initial settings of the event, such as increasing the ticket limit and the scarcity limit associated with the event in block 950. In one embodiment, adjusting the settings of the event represents an allocation of additional resources by the method 900. Once these values have been increased, the event may be opened again to the public in block 920 as previously described.

Referring now to FIG. 10, a block/flow diagram view of a portion of computer systems 1000 configured to distribute content across multiple channels in an exemplary online interactive event environment in accordance with at least one embodiment. The computer systems 1000 include a database of event origination material 1010 (live and/or recorded on demand), encoding and transmission stations 1020, content distribution network 1030, and multiple event clients 1040 installed on user media devices. At least one user media device having a camera/microphone selector 1050.

The event origination material is transmitted as raw audio/visual data to multiple encoders and transmitters. Encoded and Compressed audio/visual streams are delivered from the encoders and transmitters to a content distribution network 1030. The content distribution network 1030 distributes multiple streams including a variety of political positional data (choose source of data, e.g., cnn, blogger, republican national party) and a variety of camera angles of the interactive event to multiple event clients 1040 installed on user media devices. In one embodiment, event clients 1040 are able to select a desired stream from the multiple streams received from the content distribution network and play the selected audio/visual stream. The event client 1040 may be deployed on a user personal computer, television, personal music player, and/or other multimedia electronic device.

In various embodiments, the event client 1040 may receive all of the potential streams from the content distribution network and may be configured to operate in at least one of three different modes. The first operational mode including rendering only the selected stream. In this first mode, only one stream is being buffered by the client and the other streams are either not buffered or ignored/discarded altogether. When a stream-switch request is signaled by the event client, the target (new) stream is buffered from scratch and the former stream is discarded.

The second operational mode including receiving partial or thumbnail non-selected streams, while receiving and rendering the full selected stream. In this second mode, one video and/or audio angle is selected and is considered primary, and is fully received and displayed. The other switchable streams are buffered slightly, received and reviewed in part or at lower bandwidth, and are displayed as animated thumbnails. When a stream switch signal is detected from a user camera button, the current primary stream becomes secondary and is relegated to a thumbnail and the target (new) stream is inflated to a fuller size and full bit rate reception.

The third operational mode including receiving full streams of all potential camera/microphone angles. In this third mode, all of the potential angles are received in full, regardless of how they are rendered. Even if secondary (non-selected) angles are rendered as thumbnails, the fact that the full-bit rate streams are receive and fully buffered results in a sense of "instant switching" from a client perspective. This scenario is generally only used in the most optimistic of network conditions with sufficient bandwidth availability.

Referring now to FIGS. 11A and 11B, block diagram views of portions of interactive event promoter user interfaces (1100 and 1110) are illustrated. Each user interface may be generated by a ticket scarcity management system configured for establishing event ticketing and corresponding ticketing schema in accordance with various embodiments.

In FIG. 11A, portions of user interface 1100 are shown illustrating creation of an event. In one embodiment, user interface 1100 includes a variety of query fields requesting event information from the promoter/producer. The query fields are often event specific, but may in various embodiments include an event name query, an event status request, an event start date, an event door opening date, a ticket price, a ticket limit, bonus tickets, remaining ticket promotion threshold, event genre, event type, link for survey of show, and front page priority sales and promotion.

In FIG. 11B, portions of user interface 1110 are shown illustrating generation of promotion codes for an event. In one embodiment, a scarcity system interacts with a promotion code system that generates promotion codes for an event. The codes may be created based on criteria established during the creation of the event or upon modification by the event promoter or other authorized user after creation of the event. In the illustrated embodiment, the promotion codes are 12-digit alphanumeric codes that can be distributed to admit people into an event.

In various embodiments, a promotion code can be granted in at least one of three forms. A first type of promotion code may work for any user and any event. In one embodiment, this type of promotion code allows a user to log into an online interactive event service, select a desired event and enter the promotion code to be granted a free ticket.

A second type of promotion code may work for a specific user and any event. In one embodiment, the designated user is registered and obtains a promotion code of the second type which represents free ticket credit that the designated user can apply to events of their own choosing.

A third type of promotion code may work for a specific event and any user. In one embodiment, a user enters the promotion code of the third type and is granted a ticket for that specific event. Promotion codes of the third type are treated differently than the other two types of promotion code for the scarcity system. More specifically, when type three promotion codes are generated, the ticket scarcity management system must count them against the allocated tickets for the given event. This is due to the character of the credit being extended by the promotion code. Specifically, as the third type of promotion code have already been allocated in the overall ticket count, tickets can still be redeemed using a type three code even for a show that is already sold out. This allows promoters to distribute the promotion codes without worrying about potential negative customer experiences as the virtual seats are held. Alternatively, in one embodiment, the promotion code may indicate that the code is valid only so long as the event is not yet sold out. This configuration may encourage individuals to obtain tickets as soon as possible.

Referring now to FIGS. 12A-12C, block diagram views of portions of interactive event promoter user interfaces (1230, 1260, and 1290) are illustrated. Each user interface may be generated by a ticket scarcity management system configured for establishing event ticketing and corresponding ticketing schema in accordance with various embodiments.

In FIG. 12A, portions of user interface 1230 are shown illustrating a countdown solicitation for an event. The countdown solicitation shows the numbers of days, hours, minutes, and seconds until admission to the event is allowed. In one embodiment, electronic reminders may be sent to individuals desiring reminders for the concert. It is to be understood that other embodiments may be utilized and structural or logical changes may be made to the user interface without departing from the scope of the present disclosure.

In FIG. 12B, portions of user interface 1260 are shown illustrating a limited seating solicitation for an event. In one embodiment, an event with a relatively scarce (e.g., 497 tickets available) seating availability is illustrated in FIG. 12B. As illustrated, the message counter in the user interface displays the number of remaining seats at the event and encourages the viewer to claim their seat for the event. In the illustrated embodiment, the available seat being offered to the user is free, however it is to be understood that other embodiments may be utilized without departing from the scope of the present disclosure including the solicitation, sale, and distribution of tickets for fixed or relative prices.

In FIG. 12C, portions of user interface 1290 are shown illustrating a sold out event redirection. When an event is sold out tickets for admission to the event is no longer available, all tickets or admission codes have been distributed. The user interface 1290 includes a reminder to look for other events by the candidate(s). The user interface 1290 also solicits the latecomer to check out other open events. In an alternative embodiment a redirection user interface similar to 1290 may be used for non-ticketed individuals trying to join the event once the event is actively playing. If the event is sold out, the user might be redirected to other concerts. However, if space at the event is still available the user might be redirected to a purchasing user interface that explains the concert has already started, but they can purchase admission for the remaining time of the event. In one embodiment, the price of admission to the event after the start may be prorated based on the anticipated remaining time of the event. Alternatively, certain time thresholds might be established to allow individuals to join the event later.

Referring now to FIGS. 13A and 13B, block diagram views of portions of interactive event promoter user interfaces (1300 and 1350) are illustrated. Each user interface may be generated by a ticket scarcity management system configured for establishing event ticketing and corresponding ticketing schema in accordance with various embodiments.

In FIG. 13A, portions of user interface 1300 are shown illustrating submission of event promotion codes. Once a user has obtained a promotion code for the event, the user interface 1300 accepts and verifies the codes. These codes may be assigned for a specific concert, artist, presentation, event, and/or series of events. Moreover, the codes may have a coupon value or monetary value, which may be applied to reduce the purchaser's obligations to the event. Alternatively, the promotion codes may also set the ticket price. As previously discussed, in the illustrated embodiment, the sample promo codes are 12-digit alphanumeric codes that can be distributed to admit people into an event for free and/or when the event is sold out to the public. In one embodiment, these promotion codes may represent reserved or held tickets for VIP attendees, radio promotion, front row, friends, family, and/or corporate sponsors.

In FIG. 13B, portions of user interface 1350 are shown illustrating a marketing ticket bonus. In the illustrated ticket bonus a potential ticket purchaser is offered free admission for additional friends once they purchase their ticket. This and other similar marketing strategies are useful characteristics when the promoter desires to employ non-traditional ticket distribution for the event.

It will be appreciated by those of ordinary skill in the art and others, that a wide variety of alternate and/or equivalent implementations of extra marketing and promotion mechanisms may be substituted for the specific embodiment of event promotion as shown.

Referring now to FIGS. 14A-14D, block diagram views of portions of user interfaces (1410, 1420, 1430, 1440) are illustrated. Each user interface generated in an interactive feedback system configured for compelling live event quality via relative interactivity in accordance with various embodiments.

Figure 14A:
FIG. 14A-14D illustrate block diagram views of portions of user interfaces configured to entice online audience participation via virtual interactivity with a live event in accordance with various embodiments.

In FIG. 14A, portions of user interface 1410 are shown illustrating the solicitation on an interactive client of an event attendee to select and transmit emotapplause via an emoticon indicative of a current emotional state of the event attendee. Emotapplause is a mechanism of sending non-verbal communication from the audience members to the candidate(s)s. By clicking graphical representations of the emotapplause (such as clapping hands, a heart, etc) a message is sent to a centralized service that aggregates all of the feedback from the audience. The candidate(s)s then see a graphical representation of the aggregated feedback. The actual experience by the candidate(s) changes based on how many audience members are using that emotapplause image at that moment, so if 70% of the audience was 'clapping' and 10% of the audience was sending kisses, the visualization might include very large clapping hands, or perhaps many clapping hands and a smaller representation of kissing lips. Other sample emoticons include a lighter, a unity or rock-on fist, a hang-loose or horned devil hand sign, a virtual bra, and clapping. It will be appreciated by those of ordinary skill in the art and others, that a wide variety of alternate and/or equivalent implementations of emotapplause may be substituted for the specific embodiment of emotapplause shown. For example, emotapplause messages may be displayed to the candidate(s)s based on statistical aggregation of the number of times each emotapplause item is clicked by audience members in accordance with one embodiment. It may be appreciated by those of ordinary skill in the art and others that a variety of algorithms may be used to determine the quantity, size and intensity of the animation that is presented to the candidate(s)s. For example, if a statistically larger percentage of the audience is clicking one icon in the most recent set of data received from the interactive clients, the associated animation may be larger than the other animations for the less used emotapplause at that moment. Alternatively, in one embodiment, if one form of emotapplause is trending up in total number of clicks over a number of recent requests for data from the service that could result in the corresponding animations also growing in size, quantity and/or intensity. Similarly, if a trend is downward, the corresponding animations could shrink in size, quantity, and/or intensity. In one embodiment, different animations may be displayed to indicate some such large milestone has been hit when detected emotapplause images from the audience hit a designated milestone in number or a threshold gauging relative intensity of user actions is reached. In one embodiment, multiple animations may be shown simultaneously, and/or different display surfaces may show different sets of animations where the placement of the display surfaces could indicate a higher or lower priority to the candidate(s) or audience. In one embodiment, animations on the audience member's interface could also show similar animations based on the activity of the overall audience, so they will be able to see how active different emotapplause items are. Various embodiments enable animations to be overlaid on the video stream to allow audience members to see exactly what the candidate(s)s are seeing.

Figure 14B:

In FIG. 14B, portions of user interface 1420 are shown illustrating the solicitation on an interactive client of an event attendee to select and transmit a prioritized interactive playlist. One of the best ways to keep an audience engaged in an event is to give them some control of how the event unfolds. Providing a voting mechanism allows them to decide what song is played next, what topic is covered next or the audience decision on the outcome of some sporting event or any number of other mechanisms for impacting the flow of the event based on popular vote. Voting can be presented as a list of choices below some header describing what is currently being voted on. Each choice has an option for the audience member to make or change their choice. When they make a choice, it is sent to the service which tallies the votes and provides summary information in the client data requests. It will be appreciated by those of ordinary skill in the art and others, that a wide variety of alternate and/or equivalent implementations of voting mechanisms may be substituted for the specific embodiment of voting on a presented playlist as shown. For example, the questions to be voted on can be sent in real time by an administrator, based on input by the candidate(s)s. In one embodiment, the voting results can be presented in real-time to candidate(s)s and/or audience members. One embodiment allows past ballot results or voting history to be saved for later use and review.

Figure 14C:
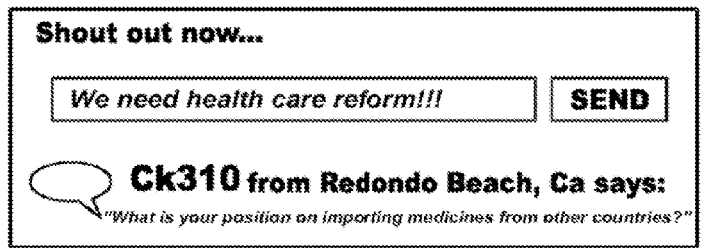

In FIG. 14C, portions of user interface 1430 are shown illustrating the solicitation on an interactive client of an event attendee to provide and transmit a virtual shout out to the candidate(s). Shout outs are a text messages sent from the audience members to the candidate(s) and audience members. The intent of the shout out is for the audience members to be able to send a directed message or question to the candidate(s)s. In addition to the candidate(s) seeing the message at the performance venue, the audience members also see a subset of the messages, thus providing a sense of community among all of the audience members. Because the number of audience members could be very large for a worldwide internet event, there is no guarantee that all messages will be presented to the candidate(s)s but due to the mechanism of transferring shout out messages, a good random sampling of messages from all audience members will be presented to both the candidate(s)s and other audience members. It will be appreciated by those of ordinary skill in the art and others, that a wide variety of alternate and/or equivalent implementations of selective instant messaging mechanisms may be substituted for the specific shout out embodiment shown. For example, in one embodiment, messages from audience members may be filtered if the same message is sent multiple times in a row to prevent "spamming" of messages to the participants. Moreover, messages from audience members may also be filtered based on content and length. In one embodiment, the audience and/or candidate(s) may be shielded from inappropriate content or specific topics. In one embodiment, a message can be filtered if too long to prevent situations where information download would be slowed by extra long messages. One variation allows long messages to be parsed and resent separately, while another throws out long messages. Determining which action should be taken may be based in part on the content of the message.

In one embodiment, specific audience members can be blocked from sending messages if they are found to be consistently sending inappropriate messages and/or "spamming" messages. When messages are blocked, various embodiments allow the audience member to still see their message as if they were sent, so that they are unaware that messages they send have been blocked.

In one embodiment, messages that are displayed to audience member and/or candidate(s) are displayed for a relative period of time related to the length of the message, so that longer messages are displayed longer while short messages go by faster. This helps audience and/or artist to both read and comprehend messages before they disappear. For example, messages like "yay!" take less time to comprehend than more complex messages like "That was amazing, what were you thinking when you wrote that song?" In one embodiment, the message animations at event location may be overlaid on the video stream to allow audience members to see exactly what the candidate(s) are seeing.

In one embodiment, when the incoming content is slow, for example from a low attendance event, the client may show messages from farther back in time. However, one embodiment monitors and limits the length of time that an old message may be used to prevent displayed messages from seeming out of context due to latency since the message was originally sent.

Figure 14D:
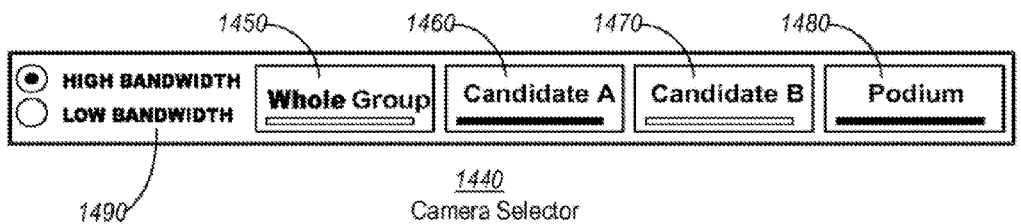

In FIG. 14D, portions of user interface 1440 are shown illustrating the solicitation on an interactive client of an event attendee to select and transmit a desired event presentation view to the producer. The selection of the video presentation may include choice of camera angle, perspective, and/or relative distance (e.g., zoom in/out). In the illustrated user interface 1440 each of the white buttons represent a unique camera and/or microphone pickup of the live event. As illustrated, user interface 1440 includes multiple perspectives and/or camera angles including whole band perspective view 1450, guitar camera 1460, drum camera 1470, and keyboards camera 1480. By clicking on one of the buttons, the video and audio perspective on the performance of the event, which is being streamed over the Internet or broadcast, is switched to reflect the requested view. The user interface 1440 also includes a bandwidth selector 1490, where a low bandwidth selection results in the client receiving a sampled version of the high bandwidth stream. Video presentation selection allows the event attendee to choose the position of their virtual seat in the performance hall.

Selectable and switchable camera angles during an online or broadcast event give an Internet- or broadcast-based audience member direct involvement in dictating what part or parts of the event they see at any given moment during the event. The viewing and/or listening to an event, either via the traditional television medium or via streamed webcasts, was previously limited to a single perspective, or vantage point of the event. This would normally be either a fixed position viewpoint, or a director's cut version of the event where a professional production director would dictate which views, which were being relayed to the audience based upon the director's estimation of the most desirable view at a given time. This provided a very limiting experience for fans who wanted more involvement in how the event is consumed.

In contrast, one embodiment calls for multiple camera angles of the interactive event to be simultaneously transmitted as part of the broadcast. The simultaneous distribution of multiple synchronized streams of audio and/or visual information enables switching between cameras to occur without interruption of the presentation of the event. In one embodiment, a performance studio might send out multiple synchronized concurrent streams. For example, a performance studio might transmit four distinct camera angles, each at varying quality levels, such as the illustrated high-bandwidth and low-bandwidth encodings.

In one embodiment, the selection of the camera angle of the event may also direct interactive portions generated by the selecting audience member towards the selected object/individual. For example, if an audience member selected the drummer then the video presentation would switch to a camera angle for the drummer and emotapplause and/or shout outs generated by the audience member would also be directed towards the drummer. Alternatively, in one embodiment, the interactive content generated by an audience member is transmitted globally to the producers of the event and selectively to the candidate(s) and other audience members of the event.

Figure 15:
FIG. 15 illustrates a block diagram view of a portion of an interactive client interface of an online interactive event environment for various after party presentations associated with an online interactive event in accordance with various embodiments of the present disclosure.

Referring now to FIG. 15, a block diagram view of a portion of an interactive client interface 1500 of after party presentations associated with an online interactive event environment is illustrated in accordance with various embodiments of the present disclosure. The interface 1500 shows various after party presentations including links to websites associated with the presenter, sponsors, upcoming events, topical news, photo and video archives, discussion boards, and other information associated with the online interactive event. In various embodiments, a playback of the event, such as a highlight reel, may also be available at the after party interactive client interface 1500. The after event interactive client interface 1500 may also include a replay of the event retrieved from the "vault" or persistent storage 259 as previously shown and described above in FIG. 2.

The above specification, examples and data provide a complete description of the manufacture and use of the composition of the invention. Although specific embodiments have been illustrated and described herein, it will be appreciated by those of ordinary skill in the art and others, that a wide variety of alternate and/or equivalent implementations may be substituted for the specific embodiment shown in the described without departing from the spirit and scope of the present disclosure. This application is intended to cover any adaptations or variations of the embodiments discussed herein. Therefore, it is manifested and intended that the disclosure be limited only by the claims and the equivalence thereof.

What is claimed is:

1. A method for participation as an online audience member in one or more of an online interactive political, social policy, social activism or issue event, comprising:
monitoring admittance to a live online event to detect whether ticketing thresholds have been obtained;
obtaining an online ticket for the live online event;
requesting admittance to the live online event based at least in part on the online ticket;
receiving at least one stream of the live online event from an event origination center after gaining admittance to the live online event;
displaying the at least one stream of the live online event to the online audience member;
generating an online feedback message, upon receiving input from the online audience member; and
transmitting the online feedback message from an interactive client to at least one of: candidates, speakers, other online audience members, other clients, producers, an event production center, the event origination center, or a network operations center of the live online event.

2. The method as recited in claim 1, wherein the receiving the at least one stream includes receiving a stream incorporating the online feedback message.

3. The method as recited in claim 2, wherein the incorporating includes aggregating data from feedback messages from other online audience members to reflect positions of the online audience, in near or real time, and displaying the aggregated data.

4. The method as recited in claim 1, wherein the requesting admittance comprises sending data associated with the online ticket to at least one of the event origination center, the event production center, or the network operations center.

5. The method as recited in claim 1, wherein the live online event includes an on demand online event.

6. The method as recited in claim 1, wherein the online feedback message influences the course of the live online event.

7. The method as recited in claim 6, wherein influencing includes one or more of: changing topics discussed at the live online event, excluding topics discussed at the live online event, changing time spent on a particular topic, changing an order of the topics being presented during the live online event, or changing an overall length of the live online event.

8. The method, as recited in claim 1, further comprising:
transmitting geographical data to at least one of the candidates, speakers, or online event organizers, the geographic data causing a modification to the live online event.

9. The method, as recited in claim 1, wherein the online feedback message comprises at least one of: voting, emotappaulse, or shoutouts, the online feedback message causing a modification to selection or order of issues to be discussed.

10. The method as is recited in claim 1 wherein transmitting the online feedback message comprises transmitting the online feedback message globally to the producers of the live online event and selectively to the candidates and other online audience members of the live online event.

11. An interactive event system comprising:
a ticketing system for monitoring admittance to an interactive political event to detect whether ticketing thresholds have been obtained and granting admission to one or more online audience members based at least in part on an online ticket;
one or more event origination centers having at least one interactive display;
a production center for producing the interactive online political event based on one or more of: event material, content received from the event origination center, and content received from the one or more online audience members;
an interactive client having at least one interactive display and a stream selector, and configured to generate and transmit event feedback to at least one of the production center, the event origination center, a network operations center, candidates, producers, a performance studio, or other online audience members of the interactive political event,
the event feedback including selection of at least one stream of the interactive political event.

12. An interactive online ticketing event system comprising:
a ticketing system for monitoring admittance to an interactive political event to detect whether ticketing thresholds have been obtained and granting admission to one or more online audience members based at least in part on an online ticket;
an event origination center having at least one interactive display;
a production center for producing the interactive political event based on event material received from the event origination center; and
at least two interactive clients, each having at least one interactive display and configured to generate and transmit online event feedback to at least one of: the production center, a network operations center, candidate, producers, the event origination center, the one or more online audience members, live audience members, or user clients of the interactive political event.

13. A method for participation in interactive online events, comprising:
monitoring admittance to an online event to detect whether ticketing thresholds have been obtained;
obtaining an online ticket for the online event;
requesting admittance to the online event based at least in part on the online ticket;
receiving multiple streams of the online event from at least one of: an event origination center, a production center, or a network operation center after gaining admittance to the online event;
selecting at least one stream from the multiple streams;
displaying the selected at least one stream of the online event on one or more online connected displays;
transmitting online audience members initiated feedback messages from an interactive client to at least one of: the production center, the event origination center, the network operations center, producers, candidates, other online audience members, clients of the interactive event, or back to the interactive client; and receiving and displaying at least one of the multiple streams of the online event from the event origination center.

14. The method as recited in claim 13, wherein the selecting the at least one stream comprises a selection of a camera angle of the online event.

15. The method as recited in claim 13, wherein the selecting the at least one stream comprises directing interactive feedback portions generated by at least one of the selecting user or another online audience member towards a selected speaker associated with a camera angle of the selected at least one stream.

16. The method as recited in claim 13 wherein the selecting the at least one stream comprises directing interactive feedback portions generated by a selecting online audience member towards at least one of producers or moderators of the online event.

17. The method as recited in claim 13, wherein the selected at least one stream comprises data regarding a speakers record regarding issues being discussed in the online event.

18. The method as recited in claim 13, wherein the selected at least one stream comprises data from at least one political party, campaign organization, or third party organization.

19. The method as recited in claim 13, wherein the selected at least one stream comprises information regarding how other users viewing the online event are interacting to the speakers positions during the online event.

20. The method as recited in claim 13, wherein the online audience members initiated feedback messages comprise at least one of: emotapplause, shout outs, or voting.

21. The method as recited in claim 13, wherein selecting the at least one stream comprises sending geographical location data.

22. The method as recited in claim 13, wherein the selected at least one stream is associated with at least one of a political party affiliation, affiliation with a particular candidate, or affiliation with a particular issue.

23. The method as recited in claim 13, wherein the online audience members initiated feedback messages comprise information associated with the online audience members relative agreement for particular positions being promoted by at least one speaker.

* * * * *